(12) United States Patent
Lisauskas et al.

(10) Patent No.: US 10,076,135 B2
(45) Date of Patent: Sep. 18, 2018

(54) BIODEGRADABLE CIGARETTE FILTER TOW AND METHOD OF MANUFACTURE

(71) Applicant: Greenbutts LLC, San Diego, CA (US)

(72) Inventors: Tadas Lisauskas, San Diego, CA (US); Xavier Alexander Van Osten, San Diego, CA (US); Matthew Tipper, York (GB); Vera Chetty, Mirfield (GB); Stephen Russell, Harrogate (GB)

(73) Assignee: Greenbutts LLC, San Diego, CA (US)

( * ) Notice: Subject to any disclaimer, the term of this patent is extended or adjusted under 35 U.S.C. 154(b) by 94 days.

(21) Appl. No.: 15/309,672

(22) PCT Filed: Mar. 2, 2015

(86) PCT No.: PCT/US2015/018355
§ 371 (c)(1),
(2) Date: Nov. 8, 2016

(87) PCT Pub. No.: WO2015/178995
PCT Pub. Date: Nov. 26, 2015

(65) Prior Publication Data
US 2017/0258128 A1    Sep. 14, 2017

Related U.S. Application Data

(60) Provisional application No. 62/002,608, filed on May 23, 2014.

(51) Int. Cl.
A24D 3/06    (2006.01)
A24D 3/10    (2006.01)
(Continued)

(52) U.S. Cl.
CPC .......... *A24D 3/068* (2013.01); *A24D 3/0229* (2013.01); *A24D 3/06* (2013.01); *A24D 3/08* (2013.01);
(Continued)

(58) Field of Classification Search
None
See application file for complete search history.

(56) References Cited

U.S. PATENT DOCUMENTS 2,881,770 A    5/1954    Touey
3,101,723 A    8/1963    Seligman et al.
(Continued)

FOREIGN PATENT DOCUMENTS

GB    1019984    2/1966
WO    08266260    10/1996
(Continued)

OTHER PUBLICATIONS

PCT/US2015/018355, ISR and Written Opinion, KIPO, dated May 29, 2015.
(Continued)

*Primary Examiner* — Dennis R Cordray
(74) *Attorney, Agent, or Firm* — Procopio Cory Hargreaves and Savitch LLP

(57) ABSTRACT

A biodegradable cigarette filter tow includes a mixture of at least two or more natural materials selected from the group consisting of hemp fiber, flax fiber, abaca fiber or pulp, sisal fiber or pulp, wood pulp, and cotton fiber or cotton flock. The mixture may also include regenerated cellulose fibers. The mixture may include a natural binder or may be hydroentangled.

19 Claims, 7 Drawing Sheets

(51) Int. Cl.
*A24D 3/02* (2006.01)
*A24D 3/08* (2006.01)
*D21H 11/12* (2006.01)
*D21H 13/08* (2006.01)
*A24D 3/14* (2006.01)

(52) U.S. Cl.
CPC ............. *A24D 3/10* (2013.01); *A24D 3/14* (2013.01); *D21H 11/12* (2013.01); *D21H 13/08* (2013.01)

(56) References Cited

U.S. PATENT DOCUMENTS

| | | |
|---|---|---|
| 3,236,244 A | 2/1966 | Irby, Jr. et al. |
| 3,311,519 A | 3/1967 | Touey et al. |
| 3,346,519 A | 10/1967 | Williams |
| 3,347,247 A | 10/1967 | Lloyd |
| 3,349,780 A | 10/1967 | Sublett et al. |
| 3,370,595 A | 2/1968 | Davis et al. |
| 3,413,382 A | 11/1968 | Ulrich |
| 3,602,231 A | 8/1971 | Dock |
| 3,972,335 A | 8/1976 | Tiggelbeck et al. |
| 5,022,964 A * | 6/1991 | Crane ............ A24D 3/10 131/341 |
| 5,360,023 A | 11/1994 | Blakely et al. |
| 5,439,010 A | 8/1995 | Ross |
| 5,453,144 A | 9/1995 | Kauffman et al. |
| 5,758,669 A | 6/1998 | Taniguchi et al. |
| 5,947,126 A | 9/1999 | Wilson et al. |
| 6,537,186 B1 | 3/2003 | Veluz |
| 3,613,284 A1 | 12/2013 | Hutchens |
| 2004/0003822 A1 | 1/2004 | Atindranath |
| 2004/0237269 A1 | 12/2004 | Arnold et al. |
| 2006/0265952 A1 | 11/2006 | Christal |
| 2007/0056600 A1 | 3/2007 | Coleman, III et al. |
| 2007/0235049 A1 | 10/2007 | Gedevanishvili et al. |
| 2009/0032037 A1 | 2/2009 | Xue et al. |
| 2009/0288669 A1 | 11/2009 | Hutchens |
| 2012/0318286 A1 | 12/2012 | Lisauskas |

FOREIGN PATENT DOCUMENTS

| | | |
|---|---|---|
| WO | 2006051422 | 5/2006 |
| WO | 2006064371 | 6/2006 |
| WO | 2010122382 | 10/2010 |
| WO | 2013124475 | 8/2013 |
| WO | 2014046680 | 3/2014 |

OTHER PUBLICATIONS

UK Intellectual Property Office, GB Application No. 1515140.0 Examination Report, dated Feb. 2, 2016.

* cited by examiner

BIODEGRADABLE CIGARETTE FILTER TOW AND METHOD OF MANUFACTURE

BACKGROUND

Field of the Invention

The present invention relates generally to a biodegradable cigarette filter and more specifically, to a non-synthetic, natural cigarette filter tow.

Related Art

Popular smoking articles have undergone significant development in the past 50 years with a recent increased awareness of limiting consumption of chemicals which can impede the emotional enjoyment of smoking cigarettes or other products. In addressing the desire for an enhanced smoking experience, much research and development has centered around the cigarette filter which currently primarily serves the purpose of filtering the smoke generated from burning tobacco. Typically, a filter has a filter tow made from plasticized cellulose acetate and can also include polyhydric alcohols, and the tow is wrapped with an inner and outer layer of cigarette paper. The inner layer is known as the plug wrap and the outer wrapping layer is known as the tipping paper. A cigarette is smoked by a consumer lighting one end and burning the tobacco rod end of the cigarette, opposite from the filter. The smoker then receives mainstream smoke into his mouth by drawing the tobacco smoke through the filter on the opposite end of the cigarette.

Certain cigarettes incorporate filter elements or tows having absorbent materials dispersed therein, such as activated carbon or charcoal materials in particulate or granular form. For example, a cigarette filter can possess multiple segments, and at least one of those segments can comprise particles of high carbon-content materials.

In other areas of the art, cellulose acetate is known and widely used in cigarette filter material. In most forms the biodegradability of cellulose acetate remains relatively low. Further, the biodegradation character of cellulose acetate is most often dependent on the degree of substitution, or the number of acetyl groups per glucose unit of the cellulose acetate molecular structure. For example, if the degree of substitution of cellulose acetate is decreased, the biodegradation rate of cellulose acetate is increased.

A typical cigarette includes a filter at one end which has a core or body which filters the smoke generated from burning tobacco and a paper wrapper having one or more wrapper layers surrounding the filter body. The filter core or body is commonly made from a fibrous filter material and a binder. After a user smokes the cigarette, the filter or cigarette butt is typically discarded. Such filters are often discarded in outdoor areas such as beaches, parks, and the like. The materials making up the filter core and binder biodegrade only very slowly over lengthy periods of time and thus cause unsightly environmental litter and pollution.

Attempts have been made to address the problem of non-biodegradable materials in filter cigarettes. In some studies, investigators have sought to introduce micro-organisms which act to accelerate the degradation process. In such methods however, the biodegradation rate of the entire filter is determined by the biodegradation rate of the material that can be easily biodegraded and, thus, the biodegradation rate of the cellulose acetate itself is not increased.

Other proposals for biodegradable and partially biodegradable filters involve relatively complicated manufacturing processes which often require chemical intermediates for production. Moreover, such methods also do not address the issue of introduction of complex chemical compounds into the environment which leads to pollution.

As such, there exists a need for a filter and methods for producing a more environmentally friendly cigarette filter to assist in decreasing pollution and litter from cigarette filters which currently employ use of chemicals and materials that are synthetic, non-biodegradable and harmful to smokers and the environment.

SUMMARY

Embodiments described herein provide for an improved biodegradable cigarette filter tow, an improved biodegradable cigarette filter material, and an improved method of making a biodegradable cigarette filter material.

According to one embodiment, a biodegradable cigarette filter tow is made from a mixture of two or more natural fibers or pulps or man-made fibers derived from natural sources, selected from the group consisting of hemp fiber, flax fiber, wood fiber pulp, abaca fiber or abaca pulp, sisal fiber or sisal pulp, and cotton fiber or cotton flock. In one example, the filter mixture also contains a man-made fiber derived from a natural resource such as wood pulp, for example regenerated cellulose fiber such as Tencel® brand cellulosic fiber, viscose, or Lyocell®. In one embodiment, the cigarette filter mixture contains three natural fibers or pulps.

In one embodiment, the biodegradable cigarette filter tow contains abaca or sisal pulp along with at least one other natural fiber material. According to one aspect, the abaca or sisal is in the form of pulp or short cut fiber. In one embodiment, the biodegradable cigarette filter tow contains wood pulp in place of abaca or sisal fiber or pulp, or in addition to abaca or sisal fiber or pulp. In one aspect, the biodegradable cigarette filter tow is made from a nonwoven, fibrous sheet of abaca or sisal pulp or fiber, hemp or abaca filler, cotton flock, and regenerated cellulose fiber, and may also contain a natural binder such as cationic starch.

In one aspect, the biodegradable filter tow comprises: 20-60% by weight of abaca or sisal pulp or fiber or wood pulp, or 20-60% by weight of combinations of two or more of wood pulp, abaca pulp or fiber, and sisal pulp or fiber; 5-25% by weight of hemp or flax short cut fibers or filler; 10-35% by weight of cotton flock; 5-40% by weight of regenerated cellulose fiber.

In one embodiment, the mixture also includes a natural binder or a binder manufactured from natural renewable sources. The binder may be derived from biopolymers or bio-based polymers, such as starch, a water soluble biodegradable polymer material such as carboxymethyl cellulose. The binder is water soluble to create a solution, or water dispersible to create binder dispersion/emulsion in water. Binder solution/dispersion/emulsion viscosity is adjusted to comply with the application process. Solid binder content applied on the fibrous web varies in range 2%-30% of dry weight. In another embodiment, no binder is used, and the filter is manufactured using a wetlaid and hydroentanglement process.

In one embodiment, the natural binder is selected from the group consisting of natural latex, vegetable gums, biopolymer or bio-based binders, such as starch based binders, cationic starch binder and binders made from renewable sources such as Carboxymethyl cellulose (CMC).

In one embodiment, an intimate blend of two or more natural fibers is used to form a nonwoven sheet for manufacturing of a cigarette filter element. The fiber blend also contains fiber from a regenerated natural polymer, preferably cellulose. A natural binder (adhesive) or binder derived from a natural source is applied to the nonwoven sheet. The binder may be applied such that it coats all of the constituent fiber surfaces, or may be applied in specific locations on the sheet. The optimum fiber morphology, fiber composition, binder content and nonwoven sheet parameters such as areal density, volume density, air permeability and mechanical properties can be altered to obtain different performance of a cigarette filter with respect to smoking parameters, such as pressure drop and retention properties. These depend on the particular product requirements. The binder provides nonwoven material with the strength for converting process. The water soluble binder allows for disintegration in dry state, and promotes quick dispersibility in high moisture (humidity) and wet state.

According to another aspect, a nonwoven sheet for use in manufacture of a biodegradable cigarette filter comprises a mixture of:

0-50% by weight of hemp fiber, hemp short cut fiber, or hemp filler;
0-50% by weight of flax fiber, flax short cut fiber, or flax filler;
0-95% by weight of abaca fiber or abaca pulp;
0-95% by weight of sisal fibers or sisal pulp;
0-50% by weight of wood pulp;
0-50% by weight of cotton fibers or cotton flock;
0-50% by weight of regenerated cellulose fibers; and
0-30% by weight of a natural binder or a binder manufactured from natural renewable sources.

According to another aspect, a method of making a biodegradable cigarette filter comprises forming a suspension of the selected natural fiber mixture in water and then draining water from the mixture to form a fibrous, nonwoven fiber sheet. The non-woven sheet is then either coated/impregnated with a binder solution, or hydroentangled using a hydroentanglement process, or a combination thereof. Binder may be applied onto the fiber mixture before or during nonwoven sheet formation. The sheets may then be pressed between rollers, and cut into strips which are then formed into cigarette filters.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a biodegradable filter element made from 100% natural and compostable materials, to be used in the manufacture of cigarettes containing tobacco or other smokable materials or to be supplied to customers for use in rolling their own cigarettes.

After reading this description it will become apparent to one skilled in the art how to implement the invention in various alternative embodiments and alternative applications. However, although various embodiments of the present invention will be described herein, it is understood that these embodiments are presented by way of example only, and not limitation.

Figure 1:
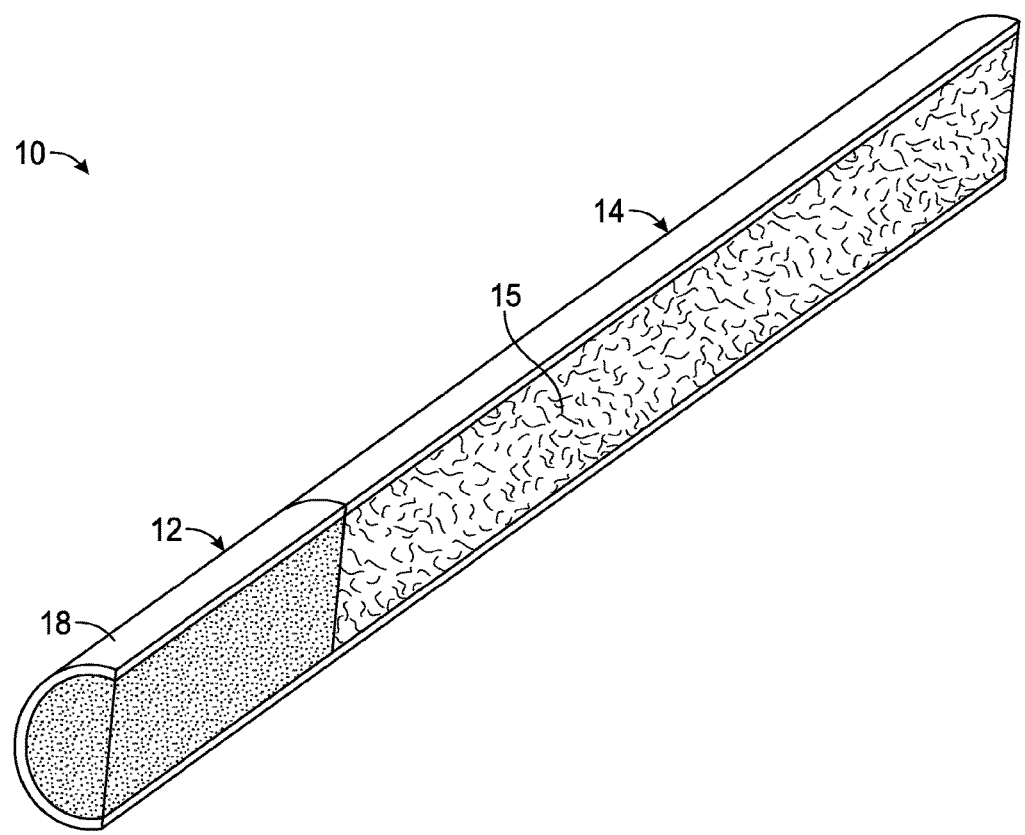
FIG. 1 is a perspective cross-sectional view of a cigarette incorporating a biodegradable filter element.
Figure 1A:
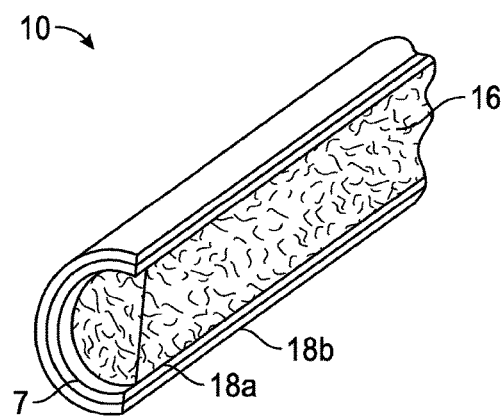
FIG. 1A is a cutaway view of part of the filter element of FIG. 1.
Figure 2:
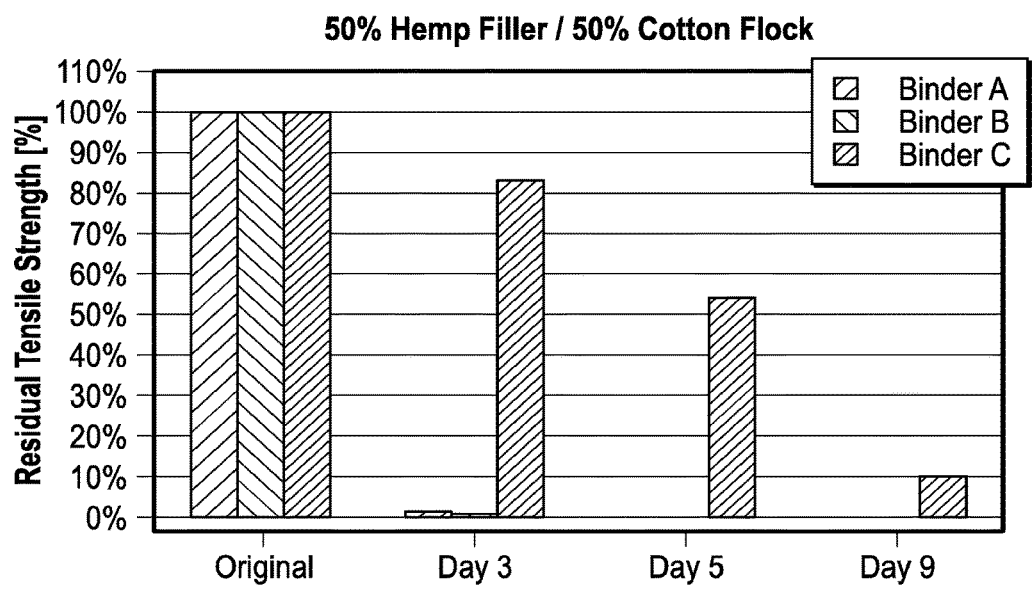
FIG. 2 is a graph showing residual tensile strength of samples comprising cotton fiber flock and wood pulp.
Figure 3:
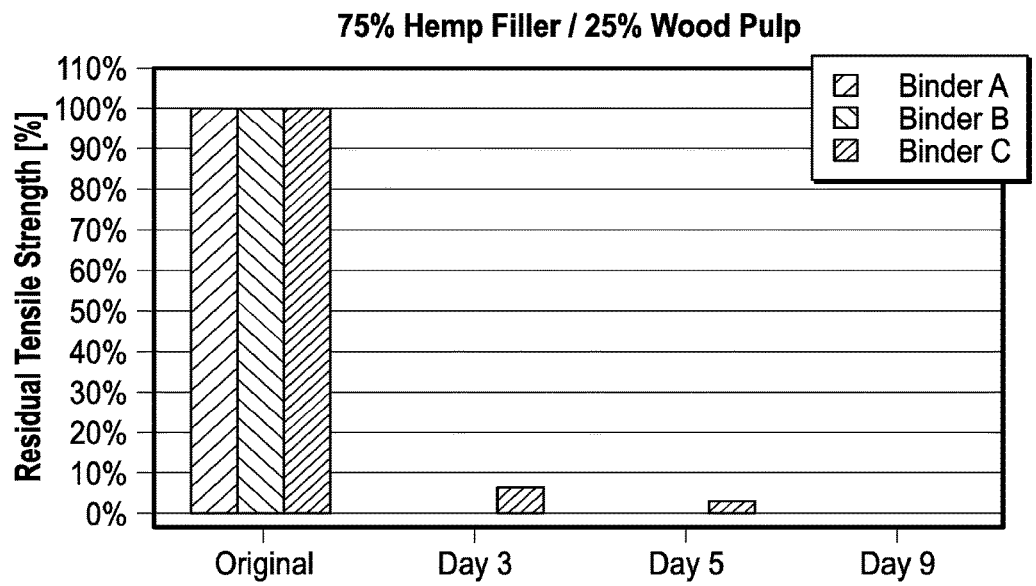
FIG. 3 is a graph showing residual tensile strength of samples comprising hemp fiber filler and wood pulp.
Figure 4:
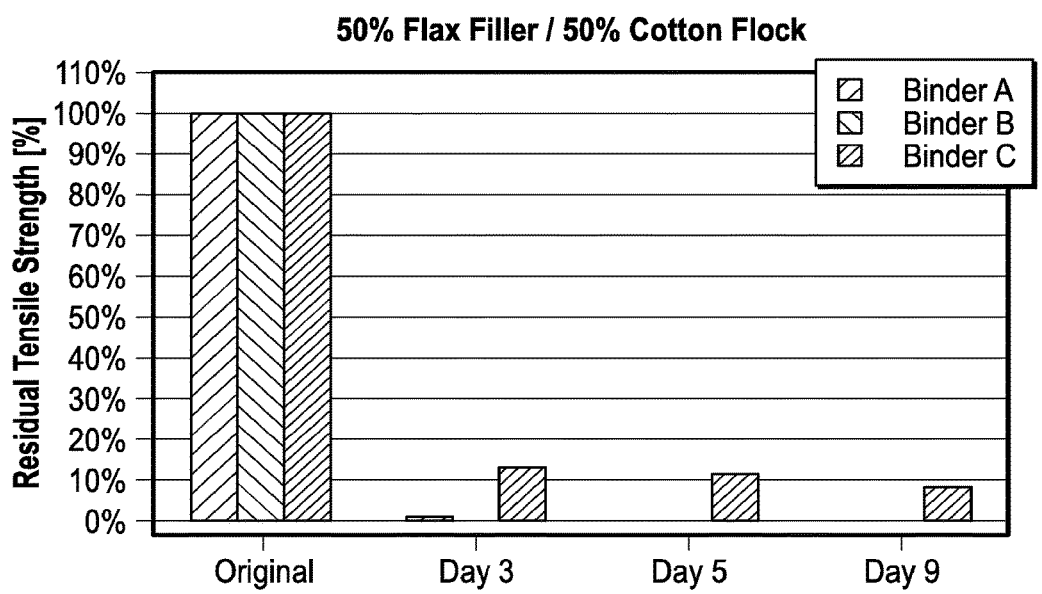
FIG. 4 is a graph showing residual tensile strength of samples comprising flax fiber filler and cotton fiber flock.
Figure 5:
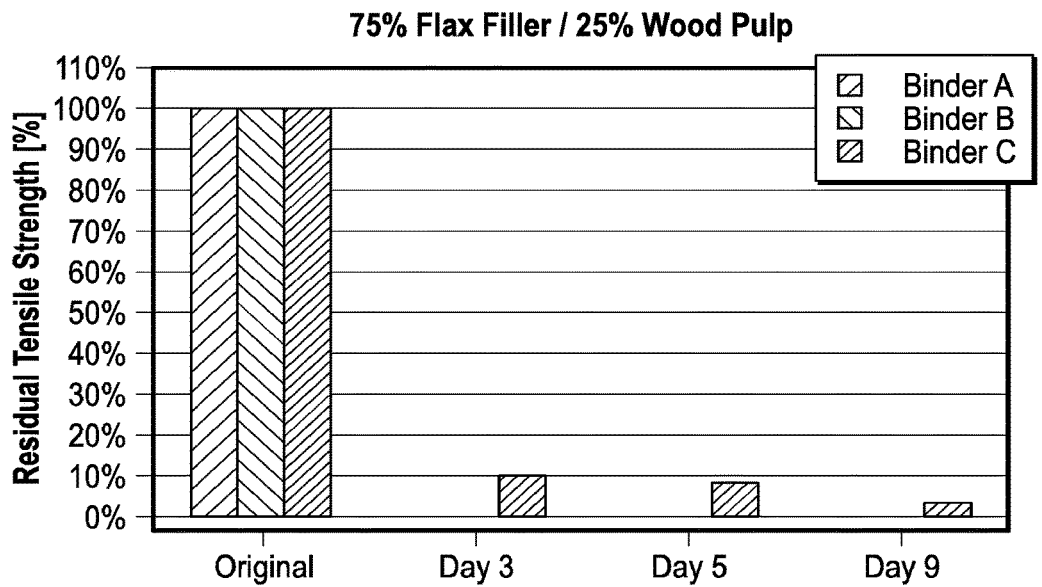
FIG. 5 is a graph showing residual tensile strength of samples comprising flax fiber filler and wood pulp.
Figure 6:
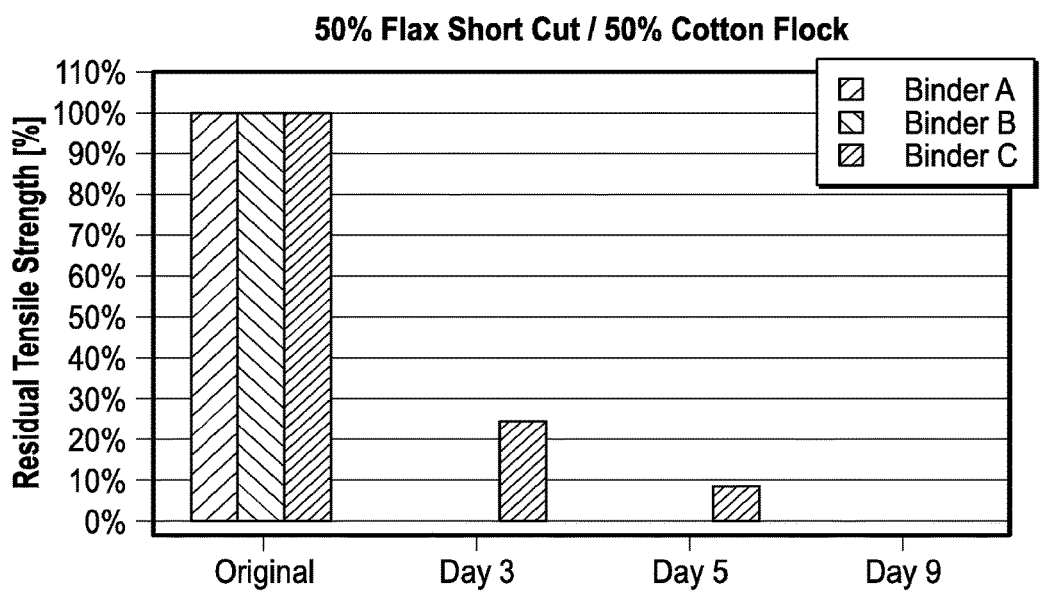
FIG. 6 is a graph showing residual tensile strength of samples comprising flax short cut fibers and cotton fiber flock.
Figure 7:
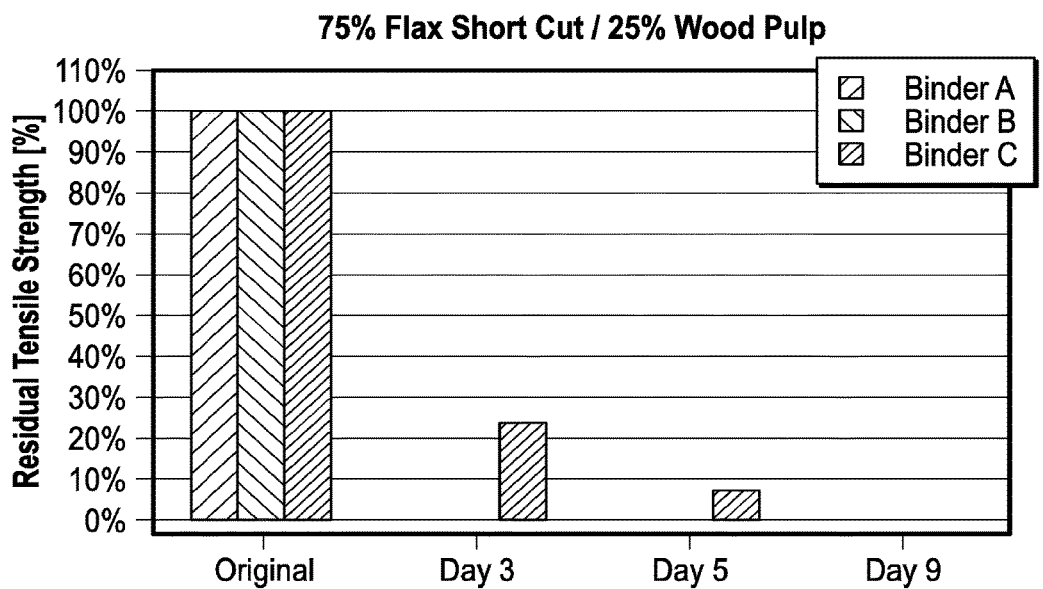
FIG. 7 is a graph showing residual tensile strength of samples comprising flax short cut fibers and wood pulp.

FIGS. 1 and 1A illustrate a cigarette 10 incorporating a first embodiment of a biodegradable filter element or body 20 surrounded by one or more outer wrapper layers 18 at one end of the cigarette. The remainder of the cigarette contains cigarette tobacco 15 or other smokable material surrounded by an elongated cylindrical tube 14 of cigarette paper. The filter material 16 of filter body 20 includes a number of natural ingredients including a biodegradable and compostable combination of natural fibers of various types bound together with a natural binder solution or dispersion, or hydroentangled. The surrounding paper or wrapper layer is wrapped around the filter body and glued along a longitudinal seam using any appropriate liquid starch adhesive.

An intimate blend of two or more natural fibers is used to form a nonwoven sheet for manufacturing of cigarette filter element 20. The fiber blend also contains fibers from a regenerated natural polymer, for example cellulose. A natural binder (adhesive) or binder derived from a natural source is applied to the nonwoven sheet. The binder may be applied such that it coats all of the constituent fiber surfaces, or may be applied in specific locations on the sheet. The optimum fiber morphology, fiber composition, binder content and nonwoven sheet parameters such as areal density, volume density, air permeability and mechanical properties can be altered to obtain different performance of a cigarette filter with respect to smoking parameters, such as pressure drop and retention properties. These depend on the particular product requirements.

The following describes examples of various different combinations of natural fiber materials and binders as filter elements and testing of the different embodiments of filter elements for suitability in cigarette manufacture. The development of the natural filter element is designed to conform to performance standards suitable for the manufacture of standard cigarette filters and roll-your-own filters.

The choice of fiber type is specifically targeted to satisfy the requirements for biodegradability, compostability and sustainability. The same applies to biodegradable binders applied to the nonwoven materials, which are also derived from natural sources, such as starch, biopolymers, natural rubber or gums, and wood pulp.

1. Screening

Both constituent fiber materials and different nonwoven fabric constructions (web formation and bonding) of some embodiments of a biodegradable cigarette filter element or tow were tested and compared, as summarized below.

1.1 Biodegradable Fibers

Biodegradable fibers, derived from natural sources, can be divided into three main groups on the basis of the nature of raw materials Plant fibers Protein fibers Regenerated and modified man-made fibers from natural sources Plant fibers are obtained from various parts of plants. Fibers such as cotton (seed fibers), leaf and bast fibers and wood pulp are commonly used in the manufacturing of nonwoven fabrics. They can be subjected to carding, airlaying and wetlaying, and consequently bonded by mechanical, chemical and thermal methods. These fabrics may assist rapid biodegradation of the nonwovens fabrics after product disposal, however, their variability in morphology and structural quality strongly depend on climate and weather conditions, protection against insect and fungi and nutrition available in the soil. All these aspects can have negative effect on fiber quality and consequently on products made of these fibers. The most common commercially available plant fibers are cotton fibers followed by bast fibers (flax, hemp, jute, ramie, kenaf); leaf fibers (abaca, sisal) and wood pulp fibers used mainly for making papers and wetlaid nonwovens.

Protein fibers are obtained from various animal species; the most commonly commercially available animal hair fiber is sheep's wool. Protein fibers, such as sheep's wool, are also commonly used renewably sourced materials. Wool fibers can be subjected to carding, airlaying as well as wetlaying, although only carding is common commercially. Their affinity to liquid binders is relatively low as well as their adhesion to thermoplastic binders, therefore processing using chemical and thermal bonding methods for wool fibers is very limited. The variability of morphology and quality of wool fibers are also strongly dependent on the climate and weather conditions, nutrition available to the animals. Wool fibers also differ depending on the part of the sheep where they have grown. Wool fibers from the sheep back are different from fibers grown on the legs, for example. These factors have negative effect on the homogeneity of the fibers. Due to the variability in fiber quality, the production processes has to be regularly adjusted to make sure that products of required parameters and properties are obtained.

Man-made fibers, derived from natural renewable sources, are generally produced from cellulose (wood) or starch (e.g. corn). The most common and commercially available fibers from regenerated cellulose are viscose and Tencel® brand cellulosic fiber. The cellulosic fibers offer very good biodegradable performance. Fibers manufactured from regenerated cellulose (e.g. viscose, Lyocell and Tencel® brand cellulosic fiber) are highly uniform fibers identical to each other with respect to fiber shape, diameter and length regardless of climatic weather conditions and seasonal changes. Processing of these fibers into nonwoven fabrics is commonplace employing a wide variety of web forming and bonding processes. Products of consistent properties are obtained without making significant adjustments during processing.

The consistency in fiber morphology and properties is critical for obtaining uniform nonwoven fabrics.

A list of some biodegradable fibers obtained from renewable sources is provided below:

| Fibers | Form | Web formation |
|---|---|---|
| Cotton | Staple fibers | Airlaid, Wetlaid, Carded |
| Bast fibers (flax, hemp, jute, ramie, kenaf) | Staple fibers, short cut fibers/flock/filler, pulp | Airlaid, Wetlaid, Carded |
| Leaf Fibers (abaca, sisal) | Staple fibers, short cut Fibers/flock/filler, pulp | Airlaid, wetlaid, carded |
| Wood pulp | Very short fibers | Wetlaid, Airlaid |
| Wool | Staple fibers | Airlaid, Carded |
| Silk | Continuous filaments | |
| Viscose | Staple fibers | Airlaid, Wetlaid, Carded |
| Viscose rayon | Spun-laid rayon | |
| Tencel ®, Lyocell | Staple fibers, short cut fibers, filaments | Airlaid, Wetlaid, Carded |

Life cycle assessment (LCA) provides many criteria to compare environmental impact of the individual fibers. Cotton fibers, for example, are low energy intensive fibers and their land use is relatively low. However the extensive water consumption and usage of fertilizers and pesticides for cotton growth have significant negative impact on the environment. On the other hand man-made fibers from regenerated cellulose have high energy use but perform well in all other criteria. Bast fibers, excluding the bio-retted hemp fibers, use little energy and their water consumption is also low. Their only disadvantage is higher land use compare to other fibers and usage of fertilizers and pesticides in the case of flax fibers.

In one embodiment, a blend of the following fibers is used to form a nonwoven sheet for manufacturing of a cigarette filter element: hemp or flax fibers or a combination of both hemp and flax fiber; abaca or sisal fibers or a combination of both abaca and sisal fibers; short cotton fibers or flock; wood pulp; and fibers made from regenerated cellulose such as Tencel® brand cellulosic fiber, Lyocell or viscose. A natural binder or a binder manufactured from natural renewable sources (typically wood pulp) is added to the nonwoven material. Suitable binders are described in more detail below.

Hemp or flax fibers or a combination of both fiber types are used to prepare the fiber blend. Very clean raw material with the lowest possible content of hard shiv is preferred. Preferably, the fibers are unbleached. Preferably, the fibers are cut or milled to a short length of <3.5 mm. Fiber parameters for one embodiment of the biodegradable cigarette filter are listed below:

Raw material cleanliness (hard wood/shiv content) is <95%, preferably <97%, most preferably <99%;

Mean fiber length is <3.5 mm, preferably <1.5 mm, and most preferably ≤1 mm;

Fiber diameter is <500 µm, preferably <100 µm and most preferably <50 µm;

Hemp or flax fiber content in the nonwoven sheet ranges from 0-50% by weight.

The hemp and flax fibers provide the filter material with natural appearance, hardness, and their short length contributes to the material's disintegration in dry state and dispersibility in water. Due to the high surface area, the fibers also contribute to the retention properties.

Abaca or sisal fibers or a combination of both are also used to prepare the fiber blend. Both fibers have relatively high fiber length and high strength. The fibers are unbleached. The fibers are refined to ensure good dispersibility before the sheet formation. Only limited level of refining is applied to open the fiber structure slightly and allow only limited hydrogen bonding in the nonwoven structure. The fiber length provides the material with strength, and the low level of hydrogen bonding promotes the disintegration in dry state and quick dispersibility in wet state. A low brightness level is required to promote the natural look of the product. Fiber parameters are listed below:

Wetness—fibers are supplied in low wetness (15-21SR) and slightly refined to Wetness in range 20-30SR, preferably 21-25SR, most preferably 21SR;
Brightness—60-75%;
Fiber content in the nonwoven material is in range 0%-95% by weight.

Abaca or sisal pulp provides the filter material with high dry tensile and tear strength, contribute to wet strength important during nonwoven manufacturing. The low level of refining promotes disintegration in dry state and quick dispersibility in wet state. The relatively low level of refining enhances low volume density and high air permeability of the material. The fibers also contribute the natural appearance of the material. Pulp fiber content in the structure also contributes to the mass uniformity of the material.

Wood pulp fibers are also used to prepare the fiber blend in some embodiments, either in addition to abaca or sisal fibers, or as an alternative to abaca or sisal. Wood pulp fibers are selected from grades designed to provide relatively long fibers and high bulk to the sheets. No refining or only a limited level of refining is applied to open the fiber structure slightly and allow only limited hydrogen bonding in the nonwoven structure. The fiber length provides the material with strength, and the low level of hydrogen bonding promotes the disintegration in dry state and quick dispersibility in wet state. A low brightness level is required to promote the natural look of the product. Fiber parameters are listed below:

Wetness—fibers are supplied in low wetness (14-20SR) and slightly refined to Wetness in range 21-25SR, preferably 21SR, most preferably below 20SR;
Brightness—<90%, preferably <85%, most preferably <80%;
Fibre length—>1.5 mm, preferably >2 mm and most preferably >2.5 mm;
Fibre width—>20 µm, preferable >30 µm, and most preferably >40 µm.

Wood pulp fibers enhance the tensile of filter material. The low level of refining promotes disintegration in the dry state and quick dispersibility in the wet state. The relatively low level of refining enhances low volume density and high air permeability of the material. Pulp fiber content in the structure also contributes to the mass uniformity of the material.

Short cotton fibers/flock used in the fiber blend are unbleached. The fibers are cut or milled from cotton linters (waste from cotton fiber textile processing). The fiber parameters are shown below:

Fiber length requires <5000 µm, preferably <1500 µm, ideally in range 250-1000 µm;
Fiber thickness average 10-50 µm, preferably 10-20 µm;
Fiber content in the nonwoven material is in range 0-50%.

The short fiber length contributes to material disintegration in dry state and quick dispersibility in wet state. Fibers obtained from waste material contribute to the sustainable claims of the product. The unbleached cotton fibers also contribute to the natural appearance of the product.

Tencel® brand cellulosic fiber, Lyocell or viscose fibers are man-made fibers derived from natural resources (typically wood pulp). Fiber parameters are shown below:
Fiber linear density in range 1.7-3.3 dtex;
Fiber length in range 2-6 mm;
Fiber content in the nonwoven material in range 0-50%.

The fiber length is selected to ensure good dispersiblity in fiber dispersion before the web formation process, and also provide the material with great wet strength during processing. Fibers from regenerated cellulose contribute to the materials tensile strength and enhance mass uniformity.

1.2 Biodegradable Binders

Binders are used in nonwoven production to enhance tensile strength of fibrous structures by forming adhesive bonds between the fibers. Many chemical bonding binders are man-made from non-renewable sources; materials such as Styrene Butadiene Rubber (SBR), acrylics and vinyl acetate polymers are commonly employed. These materials are generally cross-linking emulsion polymers activated by heat but are not considered biodegradable.

Biodegradable binders are usually dissolved into a solution or dispersed into a dispersion/emulsion and applied on fibrous structure in liquid form. Hence the structure is dried and the binder consolidated in the structure providing improved mechanical properties.

In one embodiment, a natural binder or binder manufactured from natural renewable sources is used. The binder is water soluble to create a solution, or water dispersible to create binder dispersion/emulsion in water. Binder solution/dispersion/emulsion viscosity is adjusted to comply with the application process. Solid binder content applied on the fibrous web varies in range 2%-30% of dry weight.

The natural binder can be natural latex, vegetable gums, biopolymer based (also bio based polymers) such as starch based binders, cationic starch binder and binders made from renewable sources such as carboxymethyl cellulose (CMC).

The binder provides nonwoven material with the strength for converting process. The water soluble binder allows for disintegration in dry state, and promotes quick dispersibility in high moisture (humidity) and wet state.

Carboxymethyl cellulose (CMC) is a water-soluble biodegradable polymer made from renewable sources (wood pulp) and used in nonwoven fabrics as a binder.

Starches are also polysacharide-based polymers extracted from variety of plants (maize, wheat, potato, rice, tapioca). They are water soluble and biodegradable and are widely used in papermaking industry.

Natural rubber (Polyisoprene) is commonly used binder in nonwoven fabrics. It is derived from latex, a milky colloid produced by some plants. It is biodegradable and commercially available in the form of water-based emulsions. Sodium alginate binder, a salt of alginic acid extracted from seaweed has also been employed in nonwoven applications.

1.3 Manufacturing of Nonwoven Fabrics

Nonwoven fabrics are flat, porous sheets made directly from separate fibers or from molten polymers formed into filaments. By forming webs of fibers or filaments and consequently bonding them by mechanical (inter-fiber friction), thermal or chemical means, strong, lightweight fabrics are produced.

Drylaid and wetlaid web formation processes use staple fibers to form fibrous webs, including plant fibers, protein fibers and man-made fibers. Spunbond and meltblowing processes are suitable for thermoplastic polymers and special types of fibers from renewable sources. All types of fibrous webs can be bonded by using any of the web bonding methods, however certain combinations of web formation and web bonding are more common in manufacturing of nonwoven fabrics than others.

1.3.1 Wetlaid Web Formation

Wetlaid paper and wetlaid nonwovens are fibrous webs with highly uniform structure made by a paper making process or a modified papermaking process, respectively. Disintegrated fibers are suspended and dispersed in water to make a slurry. The slurry is then transported to a formation wire where fibers form a uniform sheet of material while water is drained off the fibers. Fibers used in wet laid process are usually shorter than 10 mm.

1.3.2 Drylaid Web Formation

In the drylaid process, fibrous webs are prepared from staple fibers usually 12 to 200 mm long using the carding process or airlaying to separate and orientate the fibers. Carding is the most common process to produce fibrous webs with predominately parallel fiber orientation in the machine direction (production direction). Parallel-laid structures are created by layering several carded webs. More randomized structures are obtained by cross-lapping of the carded web at an angle.

Structures with more isotropic fiber orientation are formed using the airlaid process. The process involves disentanglement of staple fibers, their dispersion in a strong stream of flowing air and deposition on a forming wire. Again, fibers commonly used in airlaid processes are usually shorter than 10 mm.

1.3.3 Mechanical Web Bonding for Nonwovens

Two main processes are used for mechanical bonding of nonwoven structures where the strength of the fabrics is secured by friction between fibers enhanced by intensive fiber entanglement. In the needle punching process, the fibers are mechanically interlocked throughout the fibrous web by the action of barbed needles moving perpendicularly to the plane of the web, transporting fibers captured in the grooves of needle barbs. Hydroentanglement (also known as spunlacing, hydraulic entanglement, or water jet needling) uses high-pressure water jets running through a fibrous web perpendicularly to its plane to initiate the fiber migration through the web and intensive entanglement.

The interaction of the energized water with fibers in a web and support surface increases the fiber entanglement and induces displacement and rearrangement of fiber segments in the web to achieve mechanical bonding. Hydroentanglement is a binder free process.

1.3.4 Chemical Web Bonding

Bonding a web by means of application of a polymer solution, emulsion or dispersion is one of the most common methods for bonding of nonwoven fabrics. Several methods are used to apply a binder in liquid or foam form to the web, such as padding, coating, dipping, spraying, print bonding and foam bonding. Subsequently, the web with applied binder is dried and thermally cured to obtain bonding action and consolidation. In the case of wetlaid nonwovens and paper manufacturing, the binder solution/emulsion/dispersion can also be added into the fiber mix prior to sheet formation. The fibrous web with binder is dried and thermally cured to obtain bonding action and consolation.

1.3.5 Thermal Web Bonding

Thermal bonding processes use heat to bond and stabilize fibrous webs that comprise of a thermoplastic binder. The binder can be in the form of thermoplastic fibers integrated into the structuring fiber formation or a powder, perforated foil, thermoplastic net or web, etc. There are three methods for thermal bonding. Calendaring uses hot rollers to apply direct heat and pressure to achieve bonding within the fibrous structures. Circulating hot air through a fibrous web is used for bonding in a hot-air oven. A heat radiation source can be also used as a non-contact thermal bonding process. The disadvantage of thermal bonding is the traditional used of non-biodegradable thermoplastic binders.

1.4 Screening Conclusions

Considering all the aspects related to different types of biodegradable fibers from renewable sources, suitable candidates for formation of nonwoven fabrics are selected from the group of plant fibers (hemp, cotton, flax, abaca, sisal) and fibers made from regenerated cellulose (viscose, Lyocell and Tencel® brand cellulosic fiber). The fabrics can be subjected to carding, airlaying or wetlaying formation processes. Mechanical or chemical bonding can be applied to consolidate and stabilize the fibrous webs and enhance their mechanical properties of the nonwoven structures. Mechanical bonding is a binder free method. Chemical bonding methods can be used to apply water-soluble biodegradable binders on the fibrous webs. Thermal bonding uses thermoplastic polymer, which are generally non-biodegradable and therefore it is not suitable for nonwovens with required rapid degradation.

Example Manufacturing Process

In one embodiment, a fibrous web (wetlaid nonwoven or wetlaid paper) of the fiber composition described above is formed by a wetlaid or paper making process. The process involves dispersion of fibers in water, delivery of the fiber dispersion to the formation wire of a wetlaid or papermaking machine (flat wire, incline wire, cylindrical mold machine, etc.). The technical differences between the processes are well known and described in literature. The concept is based on the fibers in the form of dispersion in water being deposited on the formation wire (aperture belt) and subsequent removal of excess water from the fiber layer by a suction system. The selection of the machinery, setting of process parameters, and addition of process additives depend on the type and morphology of fibers involved in the process. The process parameters are set to provide sufficient fiber dispersion, uniform deposition of fibers on the forming wire, fiber orientation in the fibrous web and areal density of the product.

A binder is applied to the formed web for web bonding. In one embodiment, the binder is in a form of solution/emulsion or foamed solution/emulsion. The binder solution/emulsion is selected to have parameters (viscosity, solid content, pH value, ionic concentration, and the like) to comply with the application process and deliver the required solid binder content on the web. Any chemical bonding process can be used, which includes but is not limited to: coating or scraper bonding, impregnation/saturation, printing, spray and/or foam bonding, etc. The processes are well known and described in literature. The binder solution/emulsion can also be added to the dilute fiber suspension prior the web formation process on the machine wire. The binder particles are mixed with the fibers in water dispersion, and deposited onto the forming wire with the fibers.

By choice of binder type and binder content, the characteristics of the fibrous web can be varied from soft and drapeable to stiff, rigid or rubbery.

The properties of binder systems can be enhanced or cost reduced by addition of other materials. This is important in facilitating of the bonding processing, enhancing the bonded web parameters and also for cost reduction. The auxiliaries include fillers, thickeners, antifoaming agents, dispersing agents, and other. Their functions are well known and described in literature.

Conventional drying processes are used to evaporate excess water and enhance the bonding of fibrous web. Convection or conduction dryers with horizontal, vertical or cylindrical drying drums are used. The type of a dryer and drying parameters (temperature, heat and mass transfer, production speed) are set to enhance the product parameters, such as mechanical properties in dry and wet state, the disintegration and dispersion of the final product in dry, moist or wet conditions.

In one embodiment, a fibrous web with applied cationic starch binder is dried in a conventional hot air oven. The drying conditions are set to dry the material but prevent excessive shrinking and degradation of the binder. The drying temperature should be set <200° C., preferably <160° C., ideally <110°.

2. Development of Natural Biodegradable Cigarette Filter Material

The development stage involved formation of nonwoven sheets from the acquired fibers and binders, and evaluation of their parameters and properties. A sheet-forming machine was used to manufacture small-scale nonwoven sheets from the different blends of natural fibers and wood pulp. Biodegradable binders were applied on the sheets using pad mangling. To identify the most suitable materials, the properties of the fabrics, including tensile strength, biodegradability and air permeability have been determined according to standard test methods.

This involved sourcing suitable types of fibers and binders, and prototyping of modified fabrics. The wetlaid process was identified as the most appropriate method to form nonwoven sheets for the cigarette filter application.

The fibers acquired are commercially available natural plant fibers such as hemp, flax and cotton. Wood pulp is a material obtained from natural source, particularly from Scandinavian soft wood trees. Biodegradable binders applied to the nonwoven sheets are derived from natural sources.

2.1 Selection of Appropriate Fibers and Binders

The fibers and binders selected for the cigarette filter element have to meet the requirements of biodegradability, compostability and sustainability. Hemp fibers are extracted from stems of *Cannabis* saliva plants. Cotton fibers are extracted from capsules protecting cotton seeds. Sisal fibers are extracted from the leaves of *Agave sisilana* plant and abaca from leaves of Musa plants. All fibers are therefore considered as materials obtained from sustainable sources.

The list of acquired natural fibers and their parameters are shown below. The wood pulp was in a form of water suspension, and the wood pulp content in the suspension was 2%. Suppliers used as sources for the fibers used in testing the filter material are provided by way of example only, and similar fibers may be obtained from other sources.

| Supplier | Fiber type | Type | Cut length [mm] | Fiber coarseness [µm] | Colour |
|---|---|---|---|---|---|
| Procotex | Flax fiber filler | quality A | 4 | Not specified | natural |
| | Flax short cut | F513/6 | 6 | 10-500 | natural |
| STW | Hemp fiber filler | F517/800 | ≈3 | 10-50 | natural |

| Supplier | Fiber type | Type | Cut length [mm] | Fiber coarseness [µm] | Colour |
|---|---|---|---|---|---|
| Goonvean Fibers | Cotton fiber flock | CD5000 | ≤5 | 10-20 | natural |
| Sodra | | | Sodra black kraft soft wood pulp | | |

Some suitable binders obtained from natural and sustainable sources for use in the cigarette filter element are starch based binders, biopolymer based binders, and isoprene or natural rubber binders. Suppliers used as sources for the binders used in testing the filter material are provided by way of example only, and similar binders may be obtained from other suppliers.

| Supplier | Binder Type | Polymer | Concentration of solution (%) |
|---|---|---|---|
| National Starch | RediBOND ® 4000 | Starch based | 32 |
| OrganoClick | OC-biobinder | Biopolymer based | 20.4 |
| Synthomer | Revultex | Isoprene (Natural rubber) | 61 |

One example of a suitable binder is a liquid, ready-to-use, cationic starch extracted from plant sources, such as maize, wheat, potato, rice or tapioca, such as RediBOND® available from Ingredion UK Limited of Manchester, UK. The material has been developed to improve dry tensile strength, softness and absorbency of the textile or paper materials.

Another example of a suitable binder is biopolymer based, such as OC-biobinder available from OrganoClick of Taby, Sweden. The type of polymer in OC-biobinder has not been revealed by the supplier. It is suggested that it is composed from completely renewable substances, such as modified biopolymers, water and natural plant compounds. It is used for improving mechanical properties of nonwoven textiles. It is considered nontoxic for humans and biodegradable.

Another binder which was tested is based on natural latex or rubber, such as Revultex, which is water-based dispersion of natural latex (rubber) with additives, manufactured by Synthomer of Harlow, UK. Natural latex is a milky colloid produced by some plants, such as the para rubber tree. Natural latex is insoluble in water, however colloidal particles can be dispersed in water and this water-based dispersion is widely used as adhesive in paper and carpet industries. Natural latex does not contain any critical hazards to man and environment, however it contains natural rubber, which can cause allergic reactions for some people.

2.2 Prototype Filter Material Formation

Small-scale prototype nonwoven sheets were formed in a sheet forming machine in accordance with TAPPI T205 standard of the forming machine.

Fiber blends were dispersed in water to create a fiber suspension. A volume of the suspension for formation of one sheet was measured out in a beaker. The sheet former was filled with water and the fiber suspension added. The water-fiber suspension was then stirred using a perforated stirrer. After 5±1 seconds, the machine drain was fully opened and the water drained through the wire grid plate under suction. The fibers were collected on the forming wire in the form of a fibrous sheet. The machine was opened and two pieces of standard blotting paper were placed on top of the fiber. The web and blotting paper were then removed, stacked between polished plates and pressure was applied in a press (stacked with 9 other samples). A pressure of 50 psi was applied for 5 minutes. After the pressure was released, the sheets were adhered to the polished plates so that the blotters were peeled off and discarded. The individual samples were fitted into drying rings and fully dried before peeling off the plate.

2.3 Binder Application

A padding machine was used to apply a binder solution on the nonwoven sheets. The liquid binders were diluted to 10% wt. solutions. All sheets were placed in a polyamide net prior processing to prevent displacement and elongation during the padding process, which would not be required on a production-scale process. Clean moving padding rolls were pressed together at 1 kg·cm$^{-2}$; the rotational speed was 2 rpm. 40 ml of the binder solution was poured and held between the rolls. The net and sheet were immersed in the binder solution, captured between the padding rolls and pulled through. The impregnated sheets were dried to constant weight at 102° C.

2.4 Test Methods 2.4.1 Tensile Strength

An Instron Tensile Tester, with a constant rate extension, was used to evaluate the tensile strength of the nonwoven sheets. The width of the tested specimen was 25 mm, the gauge length 75 mm and the loading speed 100 mm·min$^{-1}$. Tensile strength is defined as the force measured at the breaking point of a specimen per the specimen width [N/25 mm].

2.4.2 Areal Density and Solid Binder Content

A digital analytical scale was introduced to evaluate the areal density and solid binder content of the wetlaid sheets.

Areal density [g·m$^{-2}$] is calculated from the weight m [g] of an individual sheet and its area s [m$^2$]:

Areal Density=$m/s$

The solid binder content [%] is calculated from a dry weight of a sheet before binder application $m_1$ [g] and after binder application $m_2$ [g]:

Solid Binder Content=$100\times(m_2-m_1)/m_2$ 2.4.3 Biodegradability

A biodegradability test was carried out according to AATCC Test Method 30-2004. The aim was to identify the time period for biodegradation of the nonwoven sheets with applied binders. A material is considered biodegraded if its residual tensile strength is 10% or lower. The residual tensile [%] strength was calculated as a ratio of the tensile strength measured after the biodegradability test $F_2$ [N/25 mm] to the original tensile strength $F_1$ [N/25 mm]:

$$\text{Residual tensile strength} = \frac{F_2}{F_1/100}$$

2.4.4 Air Permeability

The air permeability was tested according to BS EB ISO 9073-15:2008 standard using a Shirley Air Permeability Tester. A tested specimen was placed on a test head of the air permeability testing apparatus and sealed with a ring with adequate tension to prevent distortion or side leakage while the test was being performed. The air suction device was turned on, airflow regulated until the maximum pressure drop $\Delta p$ [Pa] value for each sheet. Readings of the airflow Q [cm$^3$/sec] were taken. The air permeability K measured over an area 5 cm$^2$ was calculated according to formula:

$K(5\ cm^2)=Q/\Delta p(cm^3\cdot sec^{-1}\cdot 5\ cm^2)$

Air permeability was also tested using EDANA standard WSP 70.01 at pressure drop 200 Pa over the area of 20 cm$^2$ or 5 cm$^2$ and presented in cm$^3\cdot$sec$^{-1}$ cm$^{-2}$.

2.4.5 Scanning Electron Microscope

The structure of selected sheets was observed using Scanning Electron microscopy (SEM).

2.5 Results 2.5.1 Areal Density and Solid Binder Content

When manufacturing nonwoven sheets, the aim was to minimize the wood pulp content in sheets comprised from textile fibers, such as cotton, hemp and flax, in order to obtain a porous and flexible structure. High wood pulp content is associated with more compact sheets and dense structures similar to paper, which is not favorable for cigarette filter applications. Conversely, some wood pulp content is necessary to provide the sheets with sufficient hydrogen bonding and the requisite tensile strength for further handling and processing. Sheets with different fiber/wood pulp contents were manufactured and tested. The wood pulp content for sheets comprising cotton fiber flock was 10% wt. and for sheets containing hemp fiber filler, flax fiber filler and flax short cut fibers, 25% wt.

The same applies when flax/cotton and hemp/cotton blends were prepared. The cotton fibers provide the sheet structure with sufficient hydrogen bonding. It was determined, that a minimum content of 50% wt. cotton fiber flock was needed to obtain sheets with sufficient strength for handling and processing.

The sheet forming process described in Section 2.2 involves a number of operations, which influence the quality of the final sheets. Sheets constructed from textile fibers reduces the hydrogen bonding making handling of sheets difficult and can result in some fiber loss to other surfaces. It has a negative effect on weight variation in the individual sheets and hence the wide range of areal densities of the individual sheets, as shown in Table 1 below. This does not occur while processing on a wetlaid pilot or industrial line.

TABLE 1

| Notification | Fiber composition | Binder applied | Areal Density(g/m$^2$) | Solid Binder Content (%) |
|---|---|---|---|---|
| 1A | 90% cotton flock 10% wood pulp | RediBOND (10%) | 55-66 | 27-29 |
| 1B | 90% cotton flock 10% wood pulp | OC-biobinder (10%) | 57-60 | 23-24 |
| 1C | 90% cotton flock 10% wood pulp | Natural Latex (10%) | 56-58 | 18-23 |

TABLE 1-continued

| Notification | Fiber composition | Binder applied | Areal Density(g/m²) | Solid Binder Content (%) |
|---|---|---|---|---|
| 2A | 50% hemp filler 50% cotton flock | RediBOND (10%) | 50-73 | 19-23 |
| 2B | 50% hemp filler 50% cotton flock | OC-biobinder (10%) | 58-67 | 19-24 |
| 2C | 50% hemp filler 50% cotton flock | Natural Latex (10%) | 54-70 | 15-22 |
| 4A | 75% hemp filler 25% cotton | RediBOND (10%) | 48-51 | 17-22 |
| 4B | 75% hemp filler 25% cotton | OC-biobinder (10%) | 48-64 | 14-16 |
| 4C | 75% hemp filler 25% cotton | Natural Latex (10%) | 47-56 | 14-15 |
| 5S-A | 50% flax filler 50% cotton flock | RediBOND (10%) | 56-70 | 26-28 |
| 5S-B | 50% flax filler 50% cotton flock | OC-biobinder (10%) | 49-67 | 23-24 |
| 5S-C | 50% flax filler 50% cotton flock | Natural Latex (10%) | 53-59 | 21-23 |
| 7S-A | 75% flax filler 25% wood pulp | RediBOND (10%) | 63-65 | 22-24 |
| 7S-B | 75% flax filler 25% wood pulp | OC-biobinder (10%) | 55-62 | 16-19 |
| 7S-C | 75% flax filler 25% wood pulp | Natural Latex (10%) | 56-58 | 20-31 |
| 5L-A | 50% flax short cut 50% cotton flock | RediBOND (10%) | 55-60 | 20-23 |
| 5L-B | 50% flax short cut 50% cotton flock | OC-biobinder (10%) | 55-60 | 21-23 |
| 5L-C | 50% flax short cut 50% cotton flock | Natural Latex (10%) | 44-53 | 23-26 |
| 7L-A | 75% flax short cut 25% wood pulp | RediBOND (10%) | 55-64 | 22-23 |
| 7L-B | 75% flax short cut 25% wood pulp | OC-biobinder (10%) | 51-62 | 16-18 |
| 7L-C | 75% flax short cut 25% wood pulp | Natural Latex (10%) | 61-91 | 31-47 |

2.5.2 Tensile Strength

The tensile strength of some embodiments of biodegradable cigarette filter materials listed in Table 1 was also evaluated to identify their ability to withstand the cigarette filter formation process. 25 mm wide strips were cut from individual sheets and clamped into an Instron Tensile Tester. The force was applied until the breaking point was reached. The values of the tensile strength and elongation at the breaking point have been recorded. The results are shown in Table 2 below.

TABLE 2

| Sheet | Aeral Density [g/m²] | Binder | Solid Binder Content [%] | Tensile Strength [N] | Elongation [mm] |
|---|---|---|---|---|---|
| 1 | 55.5 | A | 28.0 | 37.0 | 2.7 |
|  | 60.2 | B | 22.7 | 50.4 | 3.4 |
|  | 56.7 | C | 17.9 | 7.6 | 6.1 |
| 2 | 59.6 | A | 23.4 | 19.5 | 2.9 |
|  | 58.0 | B | 23.8 | 36.4 | 2.9 |
|  | 54.7 | C | 14.8 | 2.3 | 4.7 |
| 4 | 49.8 | A | 2.3 | 16.5 | 2.2 |
|  | 48.1 | B | 15.8 | 16.7 | 1.4 |
|  | 55.5 | C | 14.5 | 8.0 | 2.8 |
| 5S | 55.9 | A | 27.7 | 33.3 | 3.1 |
|  | 59.4 | B | 23.6 | 46.1 | 2.9 |
|  | 53.4 | C | 23.4 | 6.7 | 5.2 |
| 7S | 63.6 | A | 22.1 | 69.4 | 3.9 |
|  | 60.5 | B | 18.0 | 73.4 | 2.7 |
|  | 68.3 | C | 30.0 | 14.2 | 4.2 |
| 5L | 54.8 | A | 21.7 | 52.3 | 2.5 |
|  | 56.7 | B | 21.2 | 39.8 | 2.3 |
|  | 44.0 | C | 25.7 | 5.9 | 5.6 |
| 7L | 55.0 | A | 23.4 | 66.8 | 2.9 |
|  | 57.6 | B | 17.1 | 87.4 | 2.5 |
|  | 61.5 | C | 31.7 | 18.4 | 4.2 |

It can be concluded that the OC-biobinder provides the strongest bonding of the sheet structures. The values of tensile strength of sheets with comparable areal density and solid binder content are higher for sheets with applied OC-biobinder than RediBOND®. The lowest tensile strength is achieved by sheets with applied natural latex.

The results also show that the sheet comprising flax fiber filler (5S and 7S) and sheets comprising short cut flax fibers (5L and 7L) have higher strength than fibers comprising hemp fiber filler (2 and 4). The highest strength is achieved by sheets comprising flax fiber filler/wood pulp blend and flax short cut fiber/wood pulp blends.

2.5.3 Biodegradability

The biodegradability of some embodiments of the nonwoven sheets was assessed by the loss of tensile strength after a period of time when the sheets were exposed to the conditions (moisture, temperature) and fungal activity in the soil bed. The fungal activity of the soil bed was evaluated using a pure cotton fabric of 167 g·m$^{-2}$. The fabric strips were inserted in the soil bed and their tensile strength was evaluated every few days. The material lost more 95% of its tensile strength after being buried in the soil bed for 9 days. According to the standard, the fungal activity is sufficient if the residual tensile strength of the pure cotton fabric is 10% or lower after being in soil for 7 days. Therefore the fungal activity in the soil bed inside the heated propagators was considered sufficient.

A thin layer of soil was spread inside a heated propagator. Four strips from each fiber/binder combination of width 25 mm and length 125 mm were placed on the soil bed and covered with 2-3 cm layer of soil. The soil moisture was monitored two times per day using a soil moisture meter.

The conditions inside the heated propagator have also been monitored during the test. The soil moisture was maintained at 20-25%, the air humidity was in the range of 90-98% rh and the temperature inside the propagator in range 15-25° C. The tensile strength of the degraded strips was tested after being in the soil bed for three, five and nine days. The test results for the various compositions are shown in FIGS. 2 to 7.

All sheets with applied starch based binder A and biobinder B lost more than 90% of their tensile strength after being in the soil bed for three days and therefore were considered biodegraded.

The sheets comprising hemp fiber filler/wood pulp and flax fiber filler/wood pulp blends with applied natural latex binder C were also biodegraded after being in the soil bed for three days. The sheets comprising flax fiber filler/cotton flock, flax short cut fibers/cotton flock and flax short cut fibers/wood pulp with applied natural latex binder were bio-degraded after being in the soil bed for five days. The sheets comprising cotton flock/wood pulp and hemp fiber filler/cotton flock and the natural latex showed the highest resistance to the conditions in the soil bed and were considered to be biodegraded after being in soil bed for nine days.

2.5.4 Air Permeability

Figure 8:
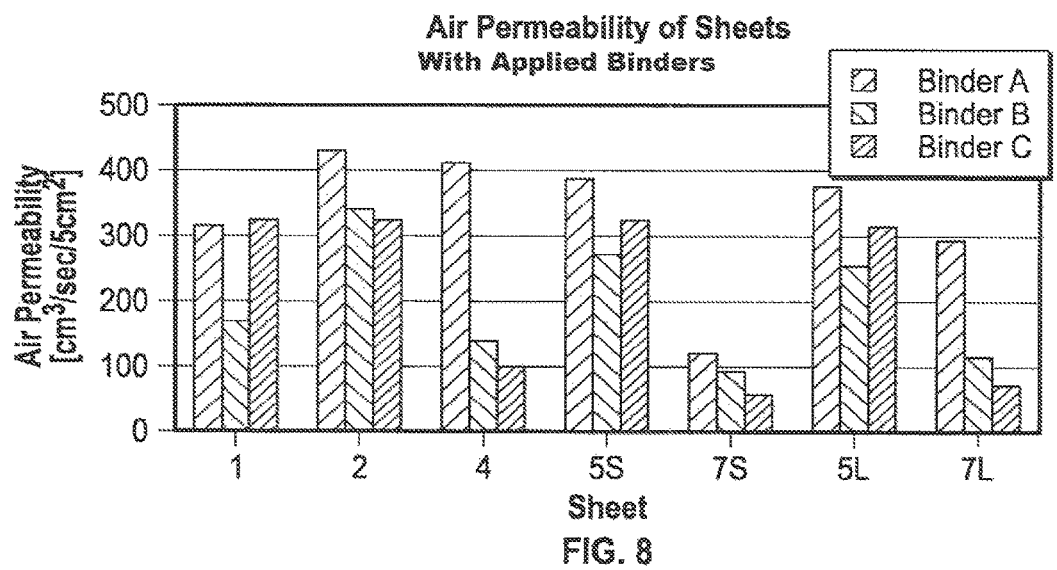
FIG. 8 is a graph showing air permeability of various different sheet samples with applied binders.

The air permeability results show that the sheets comprising 25% of wood pulp (4, 7S, 7L) allow lower volume of air to be passed through their structure compared to sheets comprising 50% of cotton fiber flock in the structure (2, 5S, 5L) and sheet comprising 90% cotton flock and only 10% of wood pulp fibers (1), as shown in FIG. 8. The results indicate that the materials comprising 25% wood pulp have lower porosity and therefore higher resistance to passing air. With regard to different binders applied on the sheets, the sheets with applied binder A have higher air permeability than the sheets of the same fiber composition with applied binders B and C. The sheets with applied binder A (5S-A and 5L-A) exhibit higher porosity than the sheets with applied binders B and C (5S-B, 5S-C, 5L-B, 5L-C) and hence they allow higher air volume to pass through their structure at the constant pressure drop.

2.5.5 Development Conclusions

The liquid binders of 10% concentration were applied on the sheets. The solid binder content on the sheets was in range 22-28% for binder A (RediBOND®), 16-24% for binder B (OC biobinder), and 14-32% for binder C (Natural latex). The relatively narrow range of the solid binder content for binder A proves that the binder is evenly distributed and dispersed in the liquid solution. Conversely, binder C (Natural latex) showed variable solid binder content on the nonwovens. The colloidal particles of natural latex are dispersed in water, not dissolved. If the dispersion is unstable, a coagulation of the colloidal particles may occur which has a negative effect on the uniformity of the particle distribution in the dispersion, and subsequently an uneven binder pick-up on the sheets is obtained. The coagulation of the colloidal particles could be eliminated by using appropriate surfactant additives.

Nonwovens sheets were formed in the range of area weight 47-67 g·m$^{-2}$. The range is considered quite high, however sheets with similar area density were selected for the tensile and air permeability testing and therefore the results are comparable. The weight can be reduced during scale-up trials on full-scale or prototype wetlaying lines.

The results of tensile strength show that the OC-biobinder (binder B) provided the sheets with the highest tensile strength values despite its lower solid binder content on the sheets (16-24%) compared to the lower tensile strength values obtained for sheets with applied binder A (RediBOND®) at higher solid binder content (22-28%). As the aim is to have as little binder content on the sheets as possible to retain the porous structure of the nonwoven sheets, the OC-binder is the better binder to achieve this aim. The lowest tensile strength was observed in the sheets with natural latex binder at the solid binder content comparable or higher than in the case of the OC-biobinder.

The highest values of tensile strength were obtained by sheets comprising flax fiber filler/wood pulp and flax short cut fibers/wood pulp blends, followed by cotton flock/wood pulp, flax fiber filler/cotton flock and flax short cut fiber/cotton flock blends. The sheets comprising hemp fiber filler showed the lowest tensile strength. The hemp fibers filler is shorter than flax fiber filler, flax short cut fibers and cotton fiber flock. The hemp fiber filler also contains pieces of hard shiv, which are residues of the core of the hemp plant not removed during the hemp fiber manufacturing process. Both factors (short fiber length and presence of the shiv) have a negative effect on the tensile strength. Hemp fiber filler was obtained from three different suppliers and the quality of the materials was very similar. It has been confirmed that this is the standard quality of hemp fiber filler commercially available.

The air permeability was higher for sheets comprised from cotton fiber flock/wood pulp, hemp fiber filler/cotton fiber flock, flax fiber filler/cotton fiber flock and flax short cut fibers/cotton fiber flock compared to sheet comprising 25% wood pulp fibers and hemp fiber filler, flax fiber filler and flax short cut fibers, respectively. The application of RediBOND® (binder A) resulted in the lowest reduction in air permeability.

The nonwoven sheets with starch based binder (such as RebiBOND®) and biopolymer-based binder (such as OC-Biobinder) exhibited excellent biodegradability. Most of the sheets with these two binders applied were biodegraded after being exposed in the soil bed for three days. All materials were bio-degraded after being in the soil bed for five days. The nonwoven sheets with applied natural latex were more resistant to biodegradation, however all sheets biodegraded within five to nine days, which is also considered a very good result.

The compositions of the nonwoven sheets manufactured in the first phase of the development stage are listed in Table 3 below.

TABLE 3

| Sheet | Fibre composition | Binder applied | Areal density [g/m$^2$] | Solid binder content [%] |
|---|---|---|---|---|
| 5S | 50% flax filler 50% cotton flock CD 5000 | A-RediBOND (10%) B-OC-biobinder (10%) | 63-65 55-62 | 22-24 16-19 |

TABLE 3-continued

| Sheet | Fibre composition | Binder applied | Areal density [g/m²] | Solid binder content [%] |
|---|---|---|---|---|
| 5L | 50% flax short cut 50% cotton flock CD 5000 | A-RediBOND (10%) B-OC-biobinder (10%) | 55-60 55-60 | 20-23 21-23 |

The best performing binder was the OC-biobinder with regard to improvement of the tensile strength of the sheets and RediBOND® with regard to the lowest air permeability reduction. The air permeability of the sheets is an important performance parameter while the tensile strength is significant for the processing of the nonwoven material into cigarette filters. If the filtration performance is considered a priority then RediBOND® or a similar starch based binder is a more suitable binder to be applied on the nonwoven materials. It may be possible to modify both properties by altering the concentration of the binder solution, so both binders should not be discounted at this stage.

3. Development—Phase 2

Sheets with fiber composition 50% flax filler/50% cotton flock and 50% flax short cut fibers/50% cotton flock were selected to be taken forward for further development. In one embodiment, hemp filler was incorporated into flax/cotton nonwoven sheets at an amount which will not affect the performance parameters.

3.1 Selection of fibers and binders

A better quality of hemp filler having a shorter fiber length and containing smaller pieces of shiv was used in some embodiments. A better quality of cotton flock with no yarn and fabric residues was also acquired. The materials are listed below. These materials help to improve the uniformity of the nonwoven sheets.

The fiber parameters are given below.

| Supplier | Fiber type | Type | Cut length [mm] | Fiber coarseness [μm] | Colour |
|---|---|---|---|---|---|
| Procotex | Flax fiber filler | quality A | 4 | Not specified | natural |
| STW | Flax short cut | F513/6 | 6 | 10-500 | natural |
|  | Hemp fiber filler | F517/250 | ≈1.5 | 10-50 | natural |
| Goonvean Fibers | Cotton fiber flock | ECD24 | <0.750 | 10-20 | natural |

In one embodiment, four types of nonwoven sheets were manufactured. Their fiber compositions were:
1. 20% hemp filler/30% flax filler/50% cotton flock
2. 20% hemp filler/30% flax shot cut fibers/50% cotton flock
3. 50% flax filler/50% cotton flock
4. 50% flax short cut fibers/50% cotton flock Three types of binders from natural and sustainable sources were applied on the nonwoven sheets. Very low values of tensile strength were obtained for sheets with applied natural rubber binder and therefore this type of binder has been excluded from the development of the nonwoven materials for the cigarette filter element. The list of binders used in this stage of the development is shown below.

| Supplier | Binder type | Polymer | Concentration of the supplied solution [%] |
|---|---|---|---|
| National Starch | RediBOND 4000 | Starch based | 32 |
| OrganoClick | OC-biobinder | Biopolymer based | 20.4 |

Small-scale prototype nonwoven sheets were formed using the sheet forming machine described in Section 2.2. A padding mangle was used to apply a binder solution on the nonwoven sheets. The liquid binders were diluted to 10% wt. solutions. The binder application process is described in Section 2.3 above.

3.3 Test Methods

Tensile strength, air permeability, areal density and binder content were evaluated using the test methods described in section 2.4. Table 4 below shows the areal density results for the four types of nonwoven sheets listed above. The biodegradability test was not carried out. Shorter hemp filler and shorter cotton flock have been used in the sheets and similar binder content applied on the sheets, therefore it is assumed that the biodegradability performance of the nonwoven sheets of fiber compositions and binder content shown in Table 4 below is similar to the one recorded for the nonwoven sheets manufactured and tested in the first development stage.

TABLE 4

| Sheet | Fibre composition | Binder applied | Areal density [g/m³] | Solid binder content [%] |
|---|---|---|---|---|
| 1 | 20% hemp filler 517/250 30% flax short cut 50% cotton flock ECD 24 | A-RediBOND (10%) B-OC-biobinder (10%) | 53-57 46-59 | 28-28.6 20-30.5 |
| 2 | 20% hemp filler 517/250 30% flax filler 50% cotton flock ECD 24 | A-RediBOND (10%) B-OC-biobinder (10%) | 57-62 53-59.5 | 26.5-29 17-20 |
| 3 | 50% flax short cut 50% cotton flock ECD 24 | A-RediBOND (10%) B-OC-biobinder (10%) | 54-64 54-56 | 31.5-32 20.5-22 |
| 4 | 50% flax filler 50% cotton flock ECD 24 | A-RediBOND (10%) B-OC-biobinder (10%) | 45.5-62 48-55 | 18-28.5 19-19.3 |

3.4 Results
3.4.1 Areal Density and Solid Binder Content

The sheet forming process described in Section 2.2 above involves a number of operations, which influence the quality of the final sheets. Constructing sheets from textile fibers (compared to wood pulp) reduces the hydrogen bonding making handling of sheets difficult and can result in some fiber loss to other surfaces. It has a negative effect on weight variation in the individual sheets and hence the wide range of areal densities of the individual sheets, given in Table 4. The consequence of weight variation is the variation in binder content on the sheets. Higher sheet weights result in increased binder pick-up.

3.4.2 Tensile Strength

Figure 10:
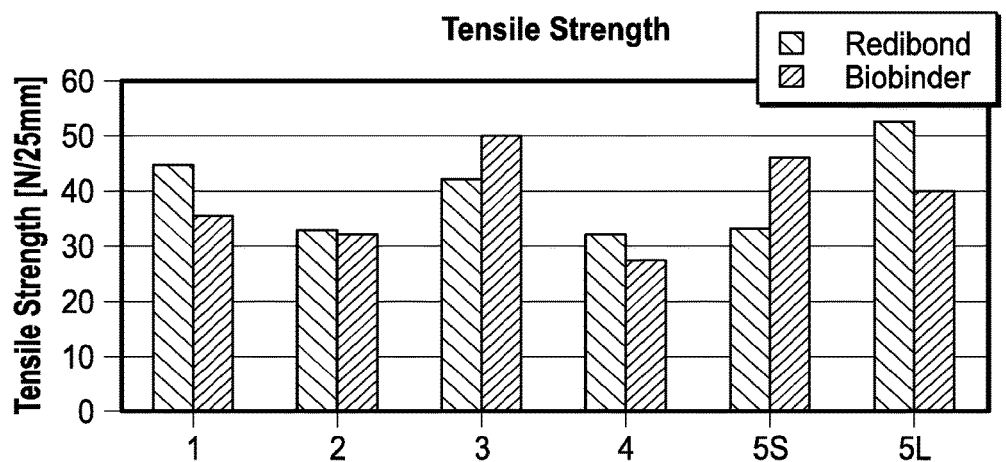
FIG. 10 is a graph showing tensile strength of the same samples as FIG. 9.

The tensile strength of the materials was evaluated to identify their ability to withstand the cigarette filter formation process. The results are shown in Table 5 below as well as in graphical form in FIG. 10, together with the values obtained for the sheets selected as the best performing materials 5S and 5L from the first phase of the development stage, as shown in Table 4 above.

TABLE 5

| Sheet | Areal Density [g/m²] | Binder | Solid Binder Content [%] | Tensile Strength [N] | Elongation [mm] |
|---|---|---|---|---|---|
| 1 | 57.3 | A | 28.5 | 44.3 | 2.6 |
|   | 48.6 | B | 22.3 | 35.5 | 3.4 |
| 2 | 56.8 | A | 26.5 | 32.7 | 2.4 |
|   | 52.8 | B | 17.0 | 32.2 | 2.7 |
| 3 | 54.4 | A | 32.0 | 41.8 | 3.2 |
|   | 56.4 | B | 20.6 | 50.0 | 2.7 |
| 4 | 53.9 | A | 23.4 | 32.2 | 2.6 |
|   | 48.0 | B | 19.3 | 27.0 | 1.8 |
| 5S | 55.9 | A | 27.7 | 33.3 | 3.1 |
|   | 59.4 | B | 23.6 | 46.1 | 2.9 |
| 5L | 54.8 | A | 21.7 | 52.3 | 2.5 |
|   | 56.7 | B | 21.2 | 39.8 | 2.3 |

All materials show very good values of tensile strength independent of the fiber composition and applied binder. The flax short-cut fiber content in sheets 5L, 1, 3 results in higher values of tensile strength compared to sheets with flax filler in the structure (5S, 2, 4).

All sheets comprising flax fiber filler (5S, 2, 4) with applied RediBOND® binder show similar values of the tensile strength. The higher tensile strength of sheets 5S from the first phase of the development stage with applied OC-biobinder compared to the sheets 2 and 4 with the same binder can be explained by higher areal density and slightly higher binder pick-up for the sheets 5S. The results also show that the 20% hemp filer content in sheet 2 does not have a negative effect on the tensile strength. The same applies for the implementation of short cotton flock fibers. The values of the tensile strength of the sheets comprising the short cotton flock (2, 4) are comparable to those for sheets with the longer cotton flock in the structure (5S).

The sheets 5L comprising flax short cut fibers/cotton flock with long fibers (5 mm) with applied RediBOND® binder show higher tensile strength values than sheets 1 comprising hemp filler/flax short cut fibers/cotton flock with short fibers (0.75 mm) and sheets 3 comprising flax short cut fibers/cotton flock with short fibers (0.75 mm). The same applies for sheets with applied OC-biobinder. The sheets 5L comprising flax short cut fibers/cotton flock with long fibers (5 mm) show higher tensile strength than the sheets with hemp filler/cotton flock (0.75 mm) in the structure (1). The sheets (3) comprising flax short cut fibers and short cotton flock (0.75 mm) with applied OC-biobinder show higher tensile strength than sheets with hemp filler content (1) due to higher areal density.

3.4.3 Air Permeability

Figure 9:
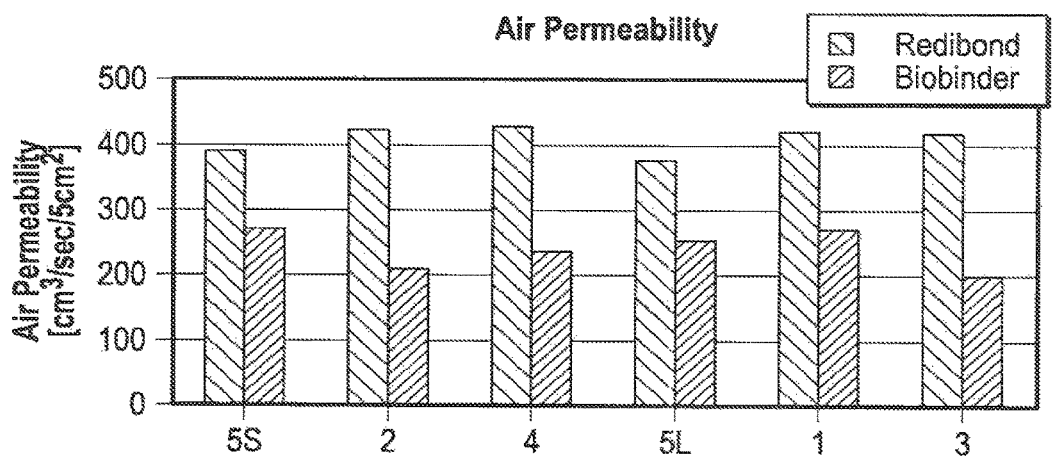
FIG. 9 is a graph showing air permeability of another set of sheet samples with different applied binders from FIG. 8.

The highest values of air permeability in the range 350-430 $cm^3 \cdot sec^{-1} 0.5 \, cm^{-2}$ were obtained for sheets with applied RediBOND® binder, as shown in FIG. 9. All sheets with OC-biobinder applied exhibited lower air permeability values in the range 200-270 $cm^3 \cdot sec^{-1} 0.5 \, cm^{-2}$. The results suggest that the RediBOND® binder provided a more open structure, which allows easier passage for the air than the sheets with applied OC-biobinder. The variability of air permeability between sheets with the same applied binder can be attributed to mass variation between the individual samples.

3.5 Cigarette Filter Tip Assembly and Retention Test

Typical prior art paper cigarette filters comprise paper filter element wrapped in a plug wrap. They are 110 mm long. In a typical cigarette making process, these filters are cut to length of 20 mm and used to assemble cigarettes.

Nonwoven sheets made of two different fiber blends FSC12 and FF listed below were used to assemble rectangular samples of 33 cm×30 cm and prepared for the cigarette filter tip assembly and smoking test. The fiber composition of the materials and the rectangular sheets are shown below.

| SHEET | FIBER COMPOSITION |
|---|---|
| FSC12 | 20% hemp filler/30% flax short cut fibers/50% cotton flock |
| FF | 20% hemp filler/25% flax filler/5% wood pulp/50% cotton flock |

The rectangular sheets were embossed and then cigarette filter tips were manually assembled. The feedback on the filter manufacturing was received; the FF sheet material seemed to emboss easier than the FSC12 (at the same setting) but broke apart easily when filters were assembled. The FSC12 material broke up a bit more on embossing but was easier to make into filters.

The results from a smoking test are shown below.

Development Retention Report
This series of filter samples recently received have been tested for retention as requested. The results are given in the table below

| Sample Id | Ref No. | Tip Length | Tip Circ | Tob Rod | Butt Length | NFDPM Mean | Nicotine Mean | Tip PD Mean | Tip PD SD | Water Mean |
|---|---|---|---|---|---|---|---|---|---|---|
| 2012-38456 | FF Sheets | 24 | 24 | Imperial 24 mm | 8 | 19.5 | 37.6 | 29 | 10.7 | 92.7 |
| 2012-38457 | FSC Sheets | 24 | 24 | Imperial 24 mm | 8 | 12.1 | 34.6 | 19 | 4.5 | 95.3 |

Figure 11:
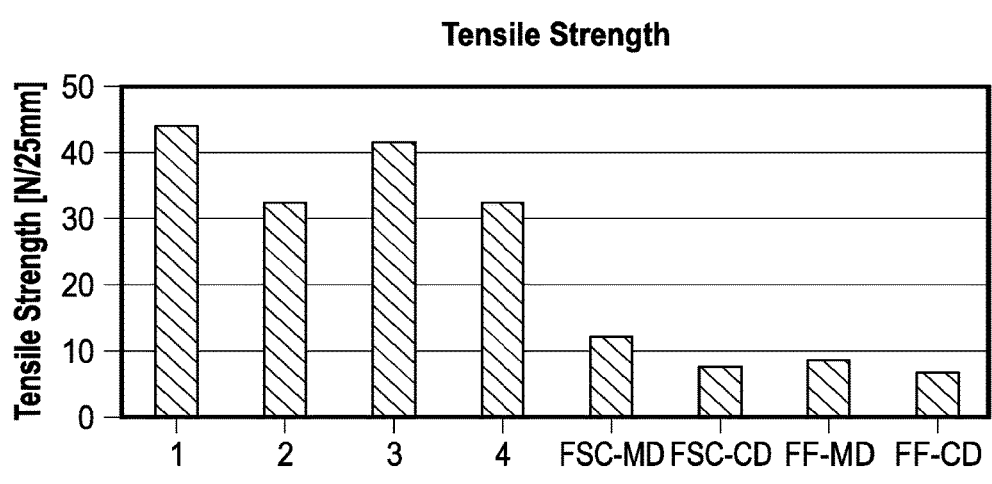
FIG. 11 is a graph showing tensile strength of samples manufactured in a development phase 2 and pilot line trial.
Figure 12:
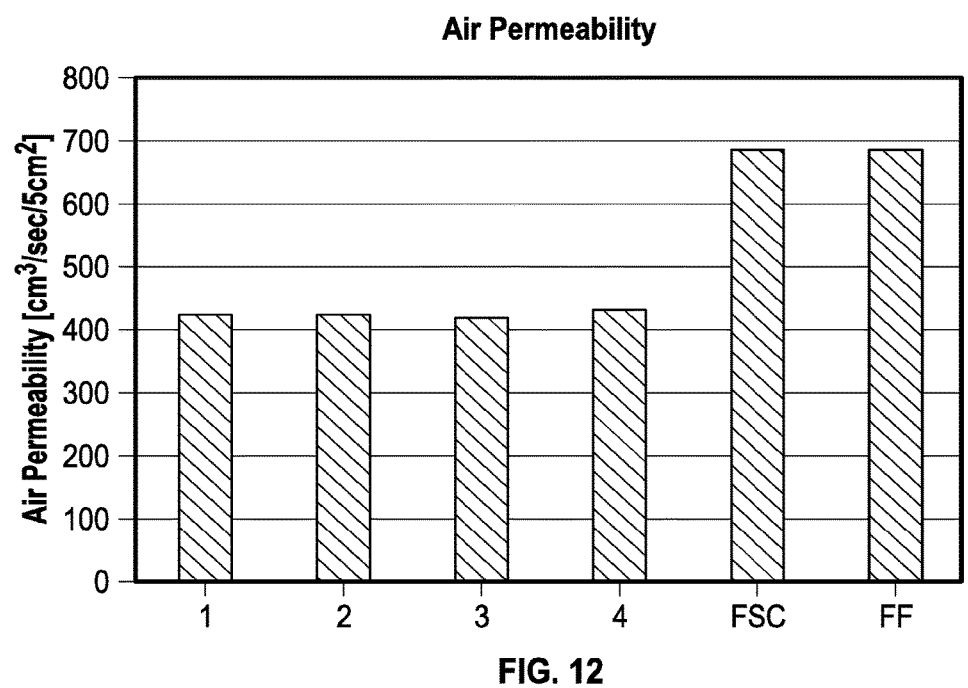
FIG. 12 is a graph showing air permeability of the same samples as FIG. 11.

Filters made from FF sheets gave more inconsistent Pressure drop (PD) readings (a larger range and more at the lower and higher ends of its scale). Filters made from FSC12 sheets gave more consistent PD readings within a narrower range. FIGS. 11 and 12 provide tensile strength and air permeability results for the FF and FSC12 materials compared with the materials listed in Table 4 above.

The table below lists physical measurements from a trial production run of a filter manufactured using materials as described above, together with the variability analysis.

| Measurable Parameters | Sample Size | Spec | Mean | SD | C of V % | Min | Max |
|---|---|---|---|---|---|---|---|
| Length | 20 | 108 | 108.19 | 0.22 | 0.20 | 107.74 | 108.59 |
| Circumference (Laser) | 40 | 24.45 | 24.41 | 0.19 | 0.78 | 24.02 | 24.73 |
| Circumference | | Specification targets | | | | 24.02 | 24.88 |
| Roundness | 40 | 100% | 95.62 | 1.74 | 1.82 | 89.5 | 97.7 |
| Finished Weight | 10 | | 0.96 | 0.01 | 0.10 | 0.95 | 0.99 |
| Full Rod PD | 40 | 391 | 377.7 | 24.2 | 6.42 | 325 | 416 |
| Filter Rod Hardness | 10 | 89 | 93.95 | 1.16 | 1.23 | 92 | 95.5 |

The table below depicts a comparison of deliveries between a commercially available cigarette using a cellulose acetate filter and a new cigarette prototype with the same cigarette column and using an embodiment of a filter manufactured as described above. Both cigarettes are unventilated and have closely matched filter pressure drop. The results show delivery of lower levels of the non-volatiles in the new cigarette as compared to the commercially available filter with a cellulose acetate filter.

| | Commercial Cigarette | | New Cigarette | |
|---|---|---|---|---|
| | Mean | SD | Mean | SD |
| Lit Puffs | 7.8 | 0.2 | 7.2 | 0.3 |
| NFDPM mg | 14.8 | 1.0 | 8.5 | 0.5 |
| Nicotin mg | 1.20 | 0.04 | 0.55 | 0.04 |
| CO mg | 13.5 | 0.5 | 13.6 | 0.3 |
| Water | 2.5 | 0.6 | 0.8 | 0.2 |

3.6 Development

A proportion of hemp fiber filler was incorporated into the selected blends and hence two other embodiments of fiber blends were included in the further development; 20% hemp filler/30% flax filler/50% cotton flock and 20% hemp filler/30% flax shot cut fibers/50% cotton flock.

Two types of liquid binders at 10% concentration were applied on the sheets. The solid binder content on the sheets was in range 21.7-32% for RediBOND® binder and 17-23.6% for OC-biobinder.

Nonwovens sheets were formed in the range of area density 48-59.4 g·m$^{-2}$. The range was considered quite large, however sheets with similar area densities were selected for the tensile and air permeability testing and therefore the results are comparable. The weight can be reduced during scale-up trials on full-scale or pilot wetlaid lines. Variation would also be expected to be much lower on full-scale production equipment.

Results for tensile strength range between 27-33 N/25 mm for samples comprising flax fiber filler (5S, 2, 4) regardless the type of applied binder. The sheet comprising hemp fiber filler (2) shows comparable values of the tensile strength to sheets 5S and 4.

Sheets comprising short flax fibers (5L, 1, 3) exhibit higher tensile strength in range 35-50 N/25 mm compared with sheets comprising flax fiber filler (5S, 2, 4). There is no noticeable difference between sheets comprising hemp fiber filler (1) and the other sheets (5L, 3).

The air permeability was higher for sheets with applied RediBOND® binder than for sheets with applied OC-biobinder.

Based on the outcomes from this development stage, the nonwoven sheets comprising 20% of hemp fiber filler provide comparable performance parameters to those without hemp filler in their structure. Based on the superior air permeability performance of nonwoven sheets with applied starch based binder, RediBOND® or other cationic starch based binder is recommended for the application.

The results from the retention test showed low pressure drop (PD) and retention levels for the filter element tips made of wetlaid sheet materials. This is likely a result of the hand-manufacturing process and perhaps not representative of a more controlled manufacturing method. The pressure drop variation was quite high, which may be due to the unusual nature of the filters and the clamping method used during testing. Hand manufacturing processes will also increase the variability in this case.

4. Pilot Line Testing

Due to the encouraging results from the cigarette filter tip assembly trial and smoking test both FF and FSC12 materials were used for a pilot line scale-up, along with other embodiments of suitable cigarette filter tip materials. An alteration of FSC12 material was suggested to improve its performance during the embossing process. It was decided to add 5% of wood pulp in the material blend for the FSC12 composition to provide more hydrogen bonding to the structure and reduce or prevent the shredding of the material when exposed to the embossing process.

In some embodiments, nonwoven sheets were made from mixtures including different blends of natural fibers, fillers or pulps as follows:
1. Hemp fiber or filler/abaca fiber or pulp/cotton fibers or cotton flock
2. Hemp fiber or filler/sisal fiber or pulp/cotton fibers or cotton flock
3. Hemp fiber or filler/abaca fiber or pulp/sisal fiber or pulp (with or without cotton fibers or cotton flock)
4. Flax fiber filler/cotton flock
5. Flax short cut fiber/cotton flock
6. Cotton flock/wood pulp
7. Flax fiber filler/wood pulp
8. Flax short cut fiber/wood pulp
9. Hemp fiber filler/cotton flock
10. Hemp fiber filler/wood pulp 4.1 Materials Fibers for the pilot trials were acquired from the manufacturers STW (flax filler, flax short cut fibers, hemp filler), Goonvean Fibers (Cotton flock), National Starch (RediBOND®). The fiber compositions in these embodiments are listed below in Table 24.

4.2 Processing

The wetlaid processing involved formation of the wetlaid web and subsequent application of a liquid binder using a curtain coating machine. The curtain coating process differs from the mangle padding process used for binder application and could enable production of lower density structures. An initial coating trial on a laboratory curtain coater was carried out to simulate the binder application process prior running the pilot line trial and identify optimum processing conditions for obtaining the required solid binder concentration on the wetlaid materials.

Reservoirs for fiber dispersion preparation were located at the beginning of the pilot line. The reservoirs were filled with a fiber suspension of a different fiber blend, as shown in Table 6 below.

TABLE 6

| Blend | Fiber composition | Binder |
|---|---|---|
| 1 | 20% hem F517/250<br>25% flax short cut fibers F513/6<br>5% wood pulp-Sodra black<br>50% cotton flock ECD24 | 6% RediBOND 4000 solution |
| 2 | 20% hem F517/250<br>25% flax filler F513/400<br>5% wood pulp-Sodra black<br>50% cotton flock ECD24 | 6% RediBOND 4000 solution |

RediBOND® 4000 binder in 6% concentration was filled in a binder reservoir (50L) and applied using a curtain coating machine. The reservoir can be topped up during the processing to ensure that a sufficient volume of the liquid binder is available.

Setting of the processing parameters is based on the experience of staff operating the wetlaid pilot line. The aim was to obtain maximum possible length of nonwoven fabrics of area weight 50 g·m$^{-2}$. Few challenges occurred during the pilot line processing. The wetlaid fabric formed from the fiber blends as they are shown in Table 6 with applied starch based (RediBOND®) binder had very low strength and it was impossible to transfer the material from the wetlaid forming wire on the conveyor to the drying oven. In addition, the RediBOND binder at 6% concentration was very tacky which caused further complications at the same point on the pilot line. It was impossible to detach the wetlaid fabric from the web forming wire.

The binder concentration was decreased to 4% to eliminate tackiness of the binder. Simultaneously, an additional type of fiber was integrated in the wetlaid structure to improve the wet strength of the fabric and reduce the risk of damage to the fabric during the transfer of the wetlaid fabric from the formation wire to the oven conveyor. Tencel® brand cellulosic fibers were selected as the most suitable fibers to overcome the difficulties with the manufacturing on the pilot line.

Tencel® brand cellulosic fibers belong to a group of fibers made from regenerated cellulose obtained from dissolved wood pulp. Regenerated cellulose fibers from Lenzing, Austria represent man-made fibers manufactured using some of the most sustainable technology. The wet strength of Tencel® brand cellulosic fibers is the highest from the group of fibers made from regenerated cellulose. The presence of Tencel® brand cellulosic fibers (1.7 dtex, 6 mm) in the fabric structure compensates for the lower solid binder content in the structures caused by lower concentration of the applied binder and hence provides strength to the dry wetlaid fabric.

Initially, 10% of Tencel® brand cellulosic fibers were added to the chest and a wetlaid fabric was formed. For the blend 1, the wet strength of the wetlaid fabric was sufficient for the transfer between forming wire and oven conveyor. However, the dry strength of the final fabric was low. To achieve sufficient dry strength of the fabrics without further alteration of the fiber blend, the areal density of the material was increased to 65 g/m2.

For blend 2, an extra 5% of Tencel® brand cellulosic fibers were added to obtain satisfactory parameters of the wetlaid fabric.

The fiber composition in the wetlaid fabrics was calculated and the fabric thickness measured. The results are shown in Table 7 below.

TABLE 7

| Blend | Fiber composition | Binder | Areal density [g/m$^2$] | Thickness [mm] |
|---|---|---|---|---|
| 1 (FSC12) | 17.5% hemp 4% F517/250<br>22% flax short cut fibers F513/6<br>8% wood pulp-Sodra black<br>44% cotton flock ECD24<br>8.5% Tencel® 1.7 dtex, 6 mm | RediBOND 4000 | 65 | 0.96 |
| 2 (FF) | 16.8% hemp 4% F517/250<br>21% flax filler F513/400<br>7.6% wood pulp-Sodra black<br>42% cotton flock ECD24<br>12.6% Tencel® 1.7 dtex, 6 mm | RediBOND | 65 | 0.90 |

The comparison of areal density, tensile strength and air permeability of samples with applied starch based binder manufactured in first development phase (Section 3), in second development phase (Section 4) and on the pilot line (Section 5) are shown in Table 8 below.

4.3 Fabric Performance

The materials manufactured on the pilot line were subjected to the analysis of their tensile strength and air permeability. The results are shown below. The tensile strength test was carried out as described in section 2.4.1 above. The tensile strength and elongation were evaluated in machine (MD) and cross direction (CD). Air permeability was also tested, as described in Section 2.4.4 at pressure drop 1 mm of water column. The results for tensile strength, elongation, and air permeability are shown in Table 14 below. The values of the tensile strength were lower than intended. The reason was the reduced concentration of the binder, which resulted in lower binder content on the fabrics.

Tensile strength and air permeability of the fabrics from the pilot line trial were compared with samples manufactured during Development phase 2 (Section 3.4) with applied RediBOND® binder, as shown in Table 8 below.

TABLE 8

| Sample | Fiber blend | Applied binder | Areal density [gm$^2$] | Tensile strength [N/25 mm] | Air permeability [cm$^3$ sec$^{-1}$ · 5 cm$^{-2}$] |
|---|---|---|---|---|---|
| 1 | 20% hemp filler 5017/250<br>30% flax short cut<br>50% cotton flock ECD24 | 10% RediBOND | 56 | 44.35 | 425 |
| 2 | 20% hemp filler 517/250<br>30% flax filler<br>50% cotton flock ECD24 | 10% RediBOND | 56.84 | 32.66 | 429.2 |
| 3 | 50% flax short cut<br>50% cotton flock ECD24 | 10% RediBOND | 54.42 | 41.81 | 421.4 |
| 4 | 50% flax filler<br>50% cotton flock ECD24 | 10% RediBOND | 53.9 | 32.2 | 433.8 |
| FSC12 | 17.5% hemp filler<br>22% flax short cut<br>8% wood pulp<br>44% cotton flock ECD24 | 4% RediBOND | 65 | MD 12.1<br>CD 7.54 | 690 |
| FF | 16.8% hemp filler<br>21% flax filler<br>7.6% wood pulp<br>42% cotton flock ECD24<br>12.6% Tencel fiber | 4% RediBOND | 65 | MC 8.35<br>CD 7.54 | 687 |

Materials manufactured on the pilot line trial exhibited lower tensile strength compared to the sheet materials due to the lower concentration of the applied binder. The air permeability is higher for the pilot line materials. The performance differences are influenced by the different methods of binder application. The wetlaid sheets are compressed between the rolls of padding mangle during the binder application in the laboratory trials, as described in Section 2.3. The padding roll pressure decreases the thickness, which results in lower porosity and hence reduced void space in the structure for transporting air. Conversely, the binder application using a curtain coater on the pilot line results in lower levels of compression to the fabric and therefore the final structure is more open and allows higher volume of air to pass through.

4.4 Cigarette Filter Tip Assembly and Smoking Test

The wetlaid rolls manufactured on the pilot line trial were slit to different widths and subjected to filter tip manufacturing process. The low strength materials, shown below, caused problems during the embossing process.

| Sheet | Fiber composition |
|---|---|
| FSC12 | 20% hemp filler/30% flax short cut fiber/50% cotton flock |
| FF | 20% hemp filler/25% flax filler/5% wood pulp/50% cotton flock |

The FSC12 material stuck to the rollers especially in the places where the hard pieces of flax shiv occur in the structure. This created holes and tears in the fabric and it also indicated possible difficulties for running this material at high speeds in a production process. The FF material embossed much easier and did not suffer the problem with shiv pieces sticking to the rolls. However the material is relatively low strength and may not be suitable in its current form for higher speeds production processing, though it may be suitable for "roll-your-own" cigarette making.

Results from the smoking test carried out at an ISO17025 accredited smoke testing laboratory are shown in Table 9 and provide the performance criteria (pressure drop, Nicotine retention, Tar retention, etc.) achieved with the cigarette filters formed from FSC12 and FF materials.

TABLE 9

Development Retention Report
This series of filter samples recently received have been tested for retention as requested. The results are given in the table below

| Sample Id | Ref No. | Tip Length mm | Tip Circ mm | Tob Rod | Butt Length mm | NFDPM Mean % | Nicotine Mean % | Tip PD Mean mm/wg | Tip PD SD mm/wg | Water Mean % | Tissue width mm |
|---|---|---|---|---|---|---|---|---|---|---|---|
| 2012-38891 | D633 4695 A | 24 | 23.8 | Imperial 24 mm | 8 | 72.9 | 76.0 | 171 | 9.7 | 95.9 | 150 |
| 2012-38892 | D633 4695 B | 24 | 23.8 | Imperial 24 mm | 8 | 60.7 | 62.9 | 96 | 6.0 | 93.5 | 130 |
| 2012-38893 | D633 4695 C | 24 | 23.8 | Imperial 24 mm | 8 | 49.5 | 52.3 | 60 | 5.8 | 89.8 | 110 |
| 2012-38894 | D633 4695 D | 24 | 23.8 | Imperial 24 mm | 8 | 92.3 | 96.7 | 561 | 21.3 | 99.0 | 220 |

TABLE 9-continued

Development Retention Report
This series of filter samples recently received have been tested for retention as requested. The results are given in the table below

| Sample Id | Ref No. | Tip Length mm | Tip Circ mm | Tob Rod | Butt Length mm | NFDPM Mean % | Nicotine Mean % | Tip PD Mean mm/wg | Tip PD SD mm/wg | Water Mean % | Tissue width mm |
|---|---|---|---|---|---|---|---|---|---|---|---|
| 2012-38895 | D633 4697 A | 24 | 23.8 | Imperial 24 mm | 8 | 84.6 | 87.4 | 326 | 13.6 | 97.8 | 180 |
| 2012-38596 | D633 4697 B | 24 | 23.8 | Imperial 24 mm | 8 | 83.1 | 85.0 | 275 | 12.3 | 95.7 | 160 |
| 2012-38897 | D633 4697 C | 24 | 23.8 | Imperial 24 mm | 8 | 66.3 | 68.0 | 127 | 9.2 | 92.1 | 130 |

4.5 Pilot Line Trial Conclusions

The processing of two selected fiber blends (FSC1212—hemp/flax short cut fibers/cotton flock/wood pulp; FF12—hemp/flax filler/cotton flock/wood pulp) with applied 6% RediBOND® binder faced some complication during the wetlaid processing on an industrial pilot line. The wet strength of the wetlaid structure was too low to withstand the manufacturing process. The high tackiness of the RediBOND® binder at 6% concentration caused adhesion of the wetlaid fabric with applied binder to the forming wetlaid wire. The fabric was susceptible to tearing at the point of transfer from the wetlaid forming wire on the conveyor to the drying oven.

Tencel® brand cellulosic fibers were added to both fiber blends to improve the wet strength of the wetlaid fabrics and the concentration of RediBOND® binder was decreased to 4% to eliminate the fabric adhesion to the forming wire. The manufacturing of the materials with Tencel® brand cellulosic fibers in their structure and lower binder concentration was successful. One roll of FSC12 and one roll of FF12 materials were produced. However, due to low binder concentration the final dry tensile strength of the wetlaid fabrics was lower than aimed for. Subsequently, the low strength caused problem in embossing during the filter tip manufacturing process.

The FSC12 sheet caused problems when embossing and stuck to the rollers where some of the hard pieces of shiv were. This created holes and tears in the fabric and as such it is considered difficult to run this material at high speeds for production purposes. The FF12 material did emboss much easier and did not suffer from the same problem. However the material was relatively weak and broke easily.

FSC12 material in four different widths (220, 180, 130 and 110 mm) was used to assemble cigarette filters ((D633/4695 A, B, C, and D) and FF12 material in three different widths (180, 160 and 130 mm) was used to assemble cigarette filters (D633/4697), as shown in Table 9. Generally, the retention and pressure drop values are higher than those for cellulose acetate filters. The filters made from the FSC12 narrow material 110 mm (D633 4695 C) provided Tar and Nicotine retention, and pressure drop values close to those achieved by very fine (1.7 dtex) cellulose acetate tow filters. The FF12 material in 130 mm width (D633 4697 C) provides Nicotine and tar retention slightly higher than the 1.7 dtex cellulose acetate tow, but the pressure drop is double. The rods made from the FCS12 material in 110 mm width and FF12 material in 130 mm width are soft in comparison to the cellulose acetate filter rods. The pressure drop variation is comparable with that achieved by cellulose acetate filters. Two fiber blends were selected for a pilot line scale-up. The outcomes of pilot line trial highlighted the need to add Tencel® brand cellulosic fibers into the blend of natural fibers to ensure sufficient wet strength of the fiber blends to withstand wetlaid industrial processing.

The starch-based binder such as RediBOND® is applied in a concentration below 6%, which results in low binder pick-up and low strength of the final wetlaid fabric. The fabric in this form caused problems during the cigarette filter tip manufacturing process. To overcome this problem, starch binder may be replaced with a different type of binder, such as carboxymethyl cellulose binder (CMC).

From the two different fiber blends, the blend containing flax fiber filler (FF12) is more suitable for the cigarette filter manufacturing process.

The smoking performance of the cigarette filters made from FSC12 material of 110 mm wide was found to be superior to other variations tested at that time. The FF12 material in 130 mm width provided slightly higher retention values than the cellulose acetate tow, but double the pressure drop. The filters made of this material were also soft.

There are two ways to decrease the retention and pressure drop values. One way is to use shorter tip lengths in the cigarettes which would also enhance the hardness (24 mm was chosen as a match for Natural American Spirit filter tips). The second way is to increase the Tencel® brand cellulosic fiber content while decreasing the cotton filler content. The cotton fiber filler comprises very short and fine fibers. If cotton fiber filler is replaced by fibers of higher diameter and length, such as regenerated cellulose fibers, a filter structure of higher porosity which has improved ability to conduct air (cigarette smoke) may be produced. Regenerated cellulose fibers also have smaller specific surface compared to the cotton flock fiber filler which may further decrease Nicotine and tar retention values.

Overall, the FF material was considered more suitable for the cigarette assembly processing due to the improved embossing performance. The wet strength of the material during the wetlaid processing as well as dry strength of the final wetlaid product may be improved by suitable choice of materials and processing steps. In one embodiment wet strength is improved by adding regenerated cellulose fibers such as Tencel® brand cellulosic fibers in the fiber blend; dry strength is improved by increasing binder pick-up on the materials, for example by using a higher concentration of a different type of binder obtained from natural sources such as carboxymethyl cellulose.

In one embodiment, the cotton fiber flock fibers in the filter compositions listed for samples FSC12 and FF12 may be replaced with coarser regenerated cellulose fibers in the structure, to increase porosity as well as air permeability. Other biodegradable fiber mixtures may be used in alternative embodiments, as discussed in more detail below.

In one embodiment, filter compositions of materials in the following % ranges may be used for production of a biodegradable filter element:
0-25% by weight hemp fiber short cut fibers or hemp filler,
0-25% by weight flax fiber short cut or flax fiber flock,
0-55% of abaca fiber or abaca pulp,
0-55% of sisal fibers or sisal pulp,
0-40% of regenerated cellulose fibers,
0-50% of wood pulp,
0-20% cotton fibers or cotton flock, and
0-20% of a natural binder (e.g. liquid starch extracted from plant sources or a water soluble biodegradable polymer material such as carboxymethyl cellulose).
If the binder is not included, the proportion of the other components remains the same, but a heavier web is manufactured (60 gsm or grams per square meter) using a hydroentanglement process. Currently the web weight with binder is approximately 50 gsm+added binder (around 10 gsm)=total weight 60 gsm.

5. Additional Embodiments

Tables 10 to 16 below list the material compositions of the FF12 and FSC12 cigarette filter nonwoven substrate materials described above and some additional examples of nonwoven material substrate compositions suitable for cigarette filters. The material codes used in Tables 10 to 16 are listed below in Table 9A.

TABLE 9A

List of tested material codes

| Material code | Machine |
| --- | --- |
| FF12 | Pilot line |
| FSC12 | Pilot line |
| FF13 | Pilot line |
| FF_Feb14 | Pilot line |
| AB_Feb14 | Pilot line |
| FF_Mar14 | Industrial line |
| AB_Oct14 | Industrial line |
| AB_Dec14 | Industrial line |
| FE1-FE4 | Sheet former |
| FE5-FE6 | Sheet former |
| FE7 | Sheet former |
| V1-V6 | Sheet former |
| V7(H) | Sheet former |
| V8-V9 | Sheet former |

TABLE 10

| Fibre composition | Fibre type/Fibre parameters | | | | |
| --- | --- | --- | --- | --- | --- |
| Binder added | FF12 | FSC12 | FF13 | FF14_Feb14 | AB_Feb14 |
| Flax | 21% Flax filler 2.5 mm | 21% Flax short cut 6 mm | 25% Flax fibre 5 mm | 25% Flax fibre 2.5 mm | 25% Abaca pulp Beater trial to 25SR Pulp Specialties |
| Hemp | 17% Hemp filler 1.5 mm | 17.5% Hemp filler 1.5 mm | 20% Hemp flock 0.25 mm | 20% Hemp flock 1.5 mm | 20% Hemp flock 1.5 mm |
| Wood pulp | 8% Sodra black beater trial to 25SR | 8% Sodra black beater trial to 25SR | 5% Sodra black beater trial to 25SR | 5% Sodra black beater trial to 25SR | 5% Sodra black beater trial to 25SR |
| Cotton | 42% Cotton flock 0.75 mm | 42% Cotton flock 0.75 mm | 15% Cotton flock 0.75 mm | 15% Cotton flock 0.75 mm | 15% Cotton flock 0.75 mm |
| Tencel | 12% Tencel 6 mm | 12% Tencel 6 mm | 35% Tencel 6 mm | 35% Tencel 6 mm | 35% Tencel 6 mm |
| Binder | Cationic starch 10-15% wt | Cationic starch 10-15% wt. | Cationic starch 10-15% wt | Cationic starch 10-15% wt. | Cationic starch 15-20% wt |

TABLE 11

| Fibre composition Binder added | Fibre type/Fibre parameters | | |
|---|---|---|---|
| | FF_Mar14 | AB_Oct14 | AB_Dec14 |
| Flax | 25% Flax filler 2.5 mm | — | — |
| Hemp | 20% Hemp flock 1.5 mm | 5% Hemp flock 1 mm | 14.5% Hemp flock 1 mm |
| Pulp | 5% Sodra black beater trial to 25SR | 45% Abaca beater trial to 27SR | 33% Abaca beater trial to 21-25 SR |
| Cotton | 15% Cotton flock 0.75 mm | 15% Cotton flock 0.75 mm | 19.5% Cotton flock 0.75 mm |
| Tencel | 35% Tencel 6 mm | 35% Tencel 6 mm | 33% Tencel 6 mm |
| Binder | Cationic starch 10-15% wt | Cationic starch 15-20% wt | Cationic starch 2-3% wt and 8-10% wt |

TABLE 12

| Fibre composition Binder added | Fibre type/Fibre parameters | | | |
|---|---|---|---|---|
| | FE1 | FE2 | FE3 | FE4 |
| Flax | 25% Flax filler 2.0 mm | 25% Flax filler 2.0 mm | 25% Flax filler 2.0 mm | 25% Flax filler 2.0 mm |
| Hemp | 20% Hemp filler 1.5 mm | 20% Hemp filler 1.5 mm | 20% Hemp filler 1.5 mm | 20% Hemp filler 1.5 mm |
| Wood pulp | 5% Sodra black beater trial to 25SR | 5% Sodra black beater trial to 25SR | 5% Sodra black beater trial to 25SR | 5% Sodra black beater trial to 25SR |
| Cotton | 50% Cotton flock 0.75 mm | 25% Cotton flock 0.75 mm | — | 35% Cotton flock 0.75 mm |
| Tencel | — | 25% Tencel 6 mm | 50% Tencel 6 mm | 15% Tencel 6 mm |
| Binder | Cationic starch I Cationic starch II | Cationic starch I Cationic starch II | Cationic starch I Cationic starch II | Cationic starch I Cationic starch II |

TABLE 13

| Fibre composition Binder added | Fibre type/Fibre parameters | | |
|---|---|---|---|
| | FE5 | FE6 | FE7 |
| Flax | 25% Flax short cut quality A 3.5 mm | 25% Flax short cut quality B 5 mm | 25% Flax short cut quality A 3.5 mm |
| Hemp | 20% Hemp filler 1.7 mm | 20% Hemp filler 1.7 mm | 20% Hemp filler 1.7 mm |
| Wood pulp | 5% Sodra black beater trial to 25SR | 5% Sodra black beater trial to 25SR | 5% Sodra black beater trial to 25SR |
| Cotton | 25% Cotton flock 0.75 mm | 25% Cotton flock 0.75 mm | 15% Cotton flock 0.75 mm |
| Tencel | 25% Tencel 6 mm | 25% Tencel 6 mm | 35% Tencel 6 mm |
| Binder | Cationic starch | Cationic starch | Cationic starch |

TABLE 14

| Fibre composition Binder added | Fibre type/Fibre parameters | | | |
|---|---|---|---|---|
| | V1 | V2 | V3 | V4 |
| Hemp | 10% Hemp filler 1.5 mm | 5% Hemp filler 1.5 mm | 10% Hemp filler 1.5 mm | 10% Hemp filler 1.5 mm |
| Pulp | 40% Abaca beater trial to 21SR | 45% Abaca beater trial to 21SR | 55% Abaca beater trial to 21SR | 25% Abaca beater trial to 21SR |
| Cotton | 15% Cotton flock 0.75 mm | 15% Cotton flock 0.75 mm | — | 30% Cotton flock 0.75 mm |
| Tencel | 35% Tencel 6 mm | 35% Tencel 6 mm | 35% Tencel 6 mm | 35% Tencel 6 mm |
| Binder | Cationic starch | Cationic starch | Cationic starch | Cationic starch |

TABLE 15

| Fibre composition | Fibre type/Fibre parameters | |
|---|---|---|
| Binder added | V5 | V6 |
| Hemp | 10% Hemp filler 1.5 mm | 10% Hemp filler 1.5 mm |
| Sisal pulp | 40% Sisal pulp beater trial to 21SR | — |
| Sisal fibre | — | 40% Sisal short cut 2.0 mm |
| Cotton | 15% Cotton flock 0.75 mm | 15% Cotton flock 0.75 mm |
| Tencel | 35% Tencel 6 mm | 35% Tencel 6 mm |
| Binder | Cationic starch | Cationic starch |

TABLE 16

| Fibre composition Binder added | Fibre type/Fibre parameters | | |
|---|---|---|---|
| | V7(H) | V8 | V9 |
| Hemp | 5% Hemp filler 1.5 mm | 10% Hemp filler 1.5 mm | 20% Hemp filler 1.5 mm |
| Abaca pulp | 45% Abaca beater trial to 27SR | 35% Abaca beater trial to 27SR | 30% Abaca beater trial to 27SR |
| Cotton | 15% Cotton flock 0.75 mm | 20% Cotton flock 0.75 mm | 15% Cotton flock 0.75 mm |
| Tencel | 35% Tencel 6 mm | 35% Tencel 6 mm | 35% Tencel 6 mm |
| Binder | Cationic starch | Cationic starch | Cationic starch |

Some important parameters for cigarette filter materials are discussed below.

Areal Density (g·m-2) and Mass Uniformity (%)

The areal density of the product can vary from 25 $g·m^{-2}$ to 65 $g·m^{-2}$. The optimum areal density is selected to comply with the cigarette filter converting process and provide required smoking performance.

Mass uniformity of the material is at least <10%, and may be <5%, or <1%.

Volume Density

Relatively low volume density provides open and bulky structure of the fibrous material. The volume density is at least <200 $kg·m^{-3}$, and may be <150 $kg·m^{-3}$, or <100 $kg·m^{-3}$.

Air Permeability

The open bulky structure allows the air to pass relatively easy through the plane of the material. Desirable air permeability measured at differential pressure 200 Pa (Pascals) is at least >20 $cm^3·cm^{-2}·sec^{-1}$, and best results are achieved with air permeability >100 $cm^3·cm^{-2}·sec^{-1}$, or >200 $cm^3·cm^{-2}·sec^{-1}$.

Tensile Strength

Tensile strength in the cigarette filter manufacturing process is not below 20N (Newton) for 25 mm wide material measured in the machine direction.

Wet Strength

Sufficient wet strength is important during the material processing (web forming, web bonding, drying). The wet strength depends on the machinery selected for the product manufacturing.

Dispersibility

The aim is for provide material which complies with Guidance Document for Flushability of Nonwoven Consumer Products issued by the European Disposables and Nonwovens Association (EDANA) in 2009. The materials listed in Tables below were evaluated using Dispersibility Shake Flask Test (FG511.1 Tier1)—Assessment of the rate and extent of disintegration of a test material in the presence of tap water. The use of orbital floor shaked capable of 150 rpm with clamps suitable for 2800 mL Fernbach triple-baffled, glass flasks is required. The material of mass 1-2 g is placed in a flask and 1 L of tap water added. The flask with the material is exposed to agitation at 150 rpm for 1 hour. After the end of the agitation, the flask is removed and the entire content of a single flask poured through a nest of screens arranged from to top to bottom in the following order: Aperture size (diameter of opening) 12 mm, 6 mm, 3 mm, 1.5 mm. The material is gently rinsed with hand held shower head held approximately 10-15 cm above the top screen for 2 minutes at water flow rate is 4 L/minute. After two minutes of rinsing, the top screen is removed and the rinse continues on the next screen for additional two minutes. This rinsing process continues until all of the screens have been rinsed. The retained material on the individual screens is removed, transferred onto a drying pan and dried in an oven. The percentage of the disintegrated test product retained on the individual screens is calculated from the initial test sample dry mass and the dry mass of the material proportion retained on the individual screens.

According to the flushability guidelines, a material is recommended for the Risk Assessment for Chemical Substances for flushability, landfill and incinerator disposal when 95% of its initial mass passes through the 12 mm screen.

Soil Burial Test

AATCC Test Method determines the soil burial test for materials in direct contact with soil. The test assesses the loss in tensile strength as a consequence of textile deterioration as a result of fungal growth. The method involves exposure to the fungal activity in a soil bed for several days. The soil bed activity is considered satisfactory if cotton woven cloth of 271 $g·m^{-2}$ looses 90% of its tensile strength in seven days exposure.

Soil bed—optimum moisture content 25±5% of dry weight, air relative humidity above 83±3% rh, soil bed height 10±1 cm.

Specimen—dimensions 75 mm×25 mm, space the specimen at least 2.5 cm apart, cover with 2.5±0.5 cm of soil bed.

Tensile test—gauge length set to 75% of the original length, loading speed 100 $mm·min^{-1}$.

The above parameters were measured for the compositions listed in Tables 10 to 16. The measured parameters are provided in the following Tables 17 to 22. Note that modified versions of compositions V1 to V5 and V7 to V9 were produced with different areal densities as well as versions with no binder and with different binder content, and test results for these alternatives are listed in Tables 20 and 21.

TABLE 17

| Material | Areal density [g·m$^{-2}$] | Thickness [mm] | Volume density [kg m$^{-3}$] | Air permeability* [cm$^{-3}$·cm$^{-2}$·sec$^{-1}$] | Tensile strength [N/25 mm] MD | Tensile strength [N/25 mm] CD |
|---|---|---|---|---|---|---|
| FF12 | 65 | 0.79 | 82.3 | 216 | 8.35 | 6.59 |
| FSC12 | 65 | 0.80 | 81.25 | 205 | 12.10 | 7.54 |
| FF13 | 61 | 0.655 | 93.1 | 292 | 23.3 | 18.5 |
| FF_Feb14 | 62 | 0.805 | 77.0 | 315 | 26.0 | 26.6 |
| AB_Feb14 | 62 | 0.69 | 89.9 | 157 | 60.7 | 47.8 |
| FF_Mar14 | 60.5 | 0.75 | 80.7 | 260 | 50 | 27 |
| AB_Oct14 | 36.0-41.7 | 0.30 | 133.3 | 192 | 50.0-63.9 | 28.0-35.5 |
| AB_Dec14 | 29.5 | 0.315 | 93.7 | 239 | 30.9 | 21.0 |

*Air permeability measured at 200 Pa

TABLE 18

| Material | Binder applied | Areal density [g·m$^{-2}$] | Binder content [%] | Tensile strength [N/25 mm] | Air permeability [cm$^3$·cm$^{-2}$·sec$^{-1}$] |
|---|---|---|---|---|---|
| FE1 no Tencel fibres | 4% Cationic starch I | 54.9 | 8.9 | 11.05 | 122 |
| | 4% Cationic starch II | 55.7 | 8.0 | 10.9 | 118 |
| | 6% Cationic starch I | 61.5 | 18.1 | 26.75 | 97.1 |
| | 6% Cationic starch II | 60.8 | 14.5 | 16.05 | 103 |
| FE4 15% Tencel fibres | 4% Cationic starch I | 59.0 | 11.26 | 31.9 | 114 |
| | 4% Cationic starch II | 58.3 | 12.3 | 31.6 | 107 |
| | 6% Cationic starch I | 61.5 | 17.0 | 31.7 | 104.5 |
| | 6% Cationic starch II | 62.4 | 17.3 | 42.7 | 106.5 |
| FE2 25% Tencel fibres | 4% Cationic starch I | 61.5 | 12.1 | 48.8 | 110.5 |
| | 4% Cationic starch II | 59.4 | 10.1 | 33.6 | 121.5 |
| | 6% Cationic starch I | 62.8 | 17.7 | 46.7 | 110.4 |
| | 6% Cationic starch II | 63.5 | 15.4 | 48.45 | 108 |
| FE4 50% Tencel fibres | 4% Cationic starch I | 59.1 | 14.0 | 54.9 | 156 |
| | 4% Cationic starch II | 59.8 | 12.6 | 52.8 | 136 |
| | 6% Cationic starch I | 66.9 | 18.8 | 73.75 | 129.5 |
| | 6% Cationic starch II | 63.9 | 20.8 | 70.85 | 128 |

*Air permeability measured at 200 Pa

TABLE 19

| Material | Areal density [g·m$^{-2}$] | Solid binder content [%] | Tensile strength [N/25 mm] | Air permeability [cm$^3$·cm$^{-2}$·s$^{-1}$] |
|---|---|---|---|---|
| FE5 | 57.3 | 13.6 | 39.8 | 93.2 |
| FE6 | N/A | | | |
| FE7 | 55.0 | 12.5 | 43.7 | 132.0 |

*Air permeability measured at 200 Pa

TABLE 20

| Material | Areal density [g·m$^{-2}$] | Binder content [% wt] | Air permeability at 200 Pa [cm$^3$·cm$^{-2}$·sec$^{-1}$] | Tensile strength [N/25 mm] |
|---|---|---|---|---|
| V1_40 | 40.4 | — | 117.5 | 16.05 |
| V1_40_B | 43.4 | 17.2 | 107.0 | 74.7 |
| V1_60 | 62.3 | — | 57.25 | 26.05 |
| V1_60_B | 56.6 | 15.3 | 60.1 | 101.05 |
| V2_40 | 39.2 | — | 85.85 | 17.6 |
| V2_40_B | 41.9 | 19.2 | 84.0 | 80.75 |
| V2_60 | 60.2 | — | 63.5 | 28.05 |
| V2_60_B | 60.3 | 15.3 | 52.1 | 120.5 |
| V3_40 | 43.0 | — | 67.35 | 28.95 |
| V3_40_B | 42.6 | 20.3 | 60.85 | 80.05 |
| V3_60 | 60.2 | — | 38.60 | 44.75 |
| V3_60_B | 64.8 | 17.2 | 37.35 | 140.0 |
| V4_40 | 40.0 | — | 121.5 | 6.1 |
| V4_40_B | 42.3 | 18.5 | 139.5 | 56.55 |
| V4_60 | 59.7 | — | 83.75 | 13.0 |
| V4_60_B | 64.0 | 16.6 | 76.05 | 92.60 |
| V5_40 | 40.0 | — | 123.5 | 15.8 |
| V5_40_B | 44.6 | 18.9 | 120.0 | 60.4 |
| V5_60 | 59.8 | — | 70.75 | 24.55 |
| V5_60_B | 63.05 | 15.1 | 70.30 | 93.3 |
| V6 | N/A | | | |

TABLE 21

| Material | Areal density [g·m$^{-2}$] | Binder content [% wt] | Air permeability at 200 Pa [cm$^3$·cm$^{-2}$·sec$^{-1}$] | Tensile strength [N/25 mm] | Tensile strength [N/15 mm] |
|---|---|---|---|---|---|
| V7_40 | 35.3 | — | 67.1 | 17.8 | 10.3 |
| V7_40_B2 | 37.4 | 9.7 | 66.3 | 54.1 | 32.5 |
| V7_40_B6 | 38.9 | 18.7 | 75.3 | 59.3 | 35.6 |
| V8_40 | 37.2 | — | 102.0 | 12.3 | 7.4 |
| V8_40_B2 | 39.2 | 11.6 | 116.3 | 46.4 | 27.8 |
| V8_40_B6 | 40.9 | 20.0 | 113.3 | 60.9 | 36.5 |
| V9_40 | 42.2 | — | 122.5 | 9.3 | 5.6 |
| V9_40_B2 | 43.8 | 10.4 | 128.8 | 52.6 | 31.6 |
| V9_40_B6 | 47.5 | 21.6 | 104.5 | 66.9 | 40.2 |
| V8_30 | 34.6 | — | 102.7 | 12.5 | 7.6 |
| V8_30_B2 | 35.7 | 10.5 | 121.2 | 48.3 | 29.0 |
| V8_30_B6 | 39.6 | 23.8 | 101.1 | 61.9 | 37.12 |
| V9_30 | 34.5 | — | 132.5 | 9.5 | 5.7 |
| V9_30_B2 | 36.8 | 11.0 | 144 | 48.0 | 28.8 |
| V9_30_B6 | 40.8 | 23.0 | 123.3 | 57.6 | 34.5 |

The results in Tables 17 to 21 show that the tested filter materials have the desired open and bulky structure and air permeability parameters.

Material dispersibility results are listed in Table 22 below.

TABLE 22

| | Shake flask test for 1 hour agitation | |
|---|---|---|
| Material | Material passing 12 mm screen [%] | Material passing 3 mm screen [%] |
| FF_March14 | 100.00 | 99.76 |
| AB_Oct14 | 100.00 | 89.76 |
| AB_Dec14 | 99.78 | 99.78 |
| V1_60_B | 100.00 | 100.00 |
| V3_60_B | 100.00 | 99.65 |
| V4_60_B | 99.69 | 99.69 |
| V2_40 | 100.00 | 100.00 |
| V2_40_B2 | 100.00 | 99.34 |
| V2_40_B6 | 100.00 | 100.00 |
| V7_40 | 100.00 | 100.00 |
| V7_40_B2 | 100.00 | 100.00 |
| V7_40_B6 | 100.00 | 100.00 |
| V8_40 | 100.00 | 100.00 |
| V8_40_B2 | 100.00 | 100.00 |
| V8_40_B6 | 100.00 | 100.00 |
| V9_40 | 100.00 | 100.00 |
| V9_40_B2 | 100.00 | 100.00 |
| V9_4_B6 | 100.00 | 100.00 |
| V8_30 | 100.00 | 100.00 |
| V8_30_B2 | 100.00 | 100.00 |
| V8_30_B6 | 100.00 | 100.00 |
| V9_30 | 100.00 | 100.00 |
| V9_30_B2 | 100.00 | 100.00 |
| V9_30_B6 | 100.00 | 100.00 |

The materials listed in Table 22 meet dispersibility requirements since the percentages of disintegrated test product remaining on a 3 mm screen following the dispersibility test described above is minimal to zero, and the materials disintegrated rapidly under wet conditions. Soil burial tests were also carried out on the above sample materials. All samples had a tensile strength lower than 90% of the original value after three to five days exposure to the fungal activity in a soil bed.

The compositions with lower hard fiber content, i.e. examples VI-V5 and V7-V9 of Tables 14 to 16, 20 and 21 which have a lower amount of hemp (or flax) provide improved processing and uniformity in the end product and thus work well in a biodegradable cigarette filter tow.

The biodegradable cigarette filter materials described above provide good smoking performance and are made of all natural and compostable materials which are readily biodegradable when cigarette butts are discarded outdoors. The filter material may be used in cigarette manufacture or supplied to customers for use in rolling their own cigarettes.

The above description of the disclosed embodiments is provided to enable any person skilled in the art to make or use the invention. Various modifications to these embodiments will be readily apparent to those skilled in the art, and the generic principles defined herein can be applied to other embodiments without departing from the spirit or scope of the invention. Thus, the invention is not intended to be limited to the embodiments shown herein but is to be accorded the widest scope consistent with the principles and novel features disclosed herein.

We claim:

1. A biodegradable cigarette filter tow, comprising:
a natural binder;
30%-40% by weight of regenerated cellulose fiber based on the total weight of fibrous material in the filter tow; and
at least three natural fibrous materials, the natural fibrous materials comprising:
5-25% by weight of hemp fiber or filler based on the total weight of fibrous material in the filter tow;
20-50% by weight of abaca pulp or fiber based on the total weight of fibrous material in the filter tow; and
10-30% by weight of cotton flock based on the total weight of fibrous material in the filter tow.

2. The filter tow of claim 1, wherein the hemp is short cut fiber.

3. The filter tow of claim 1, wherein the natural binder is cationic starch.

4. The filter tow of claim 1, wherein the abaca is abaca pulp.

5. The filter tow of claim 1, wherein the natural binder is selected from the group consisting of natural latex, vegetable gum, starch based binder, cationic starch binder, carboxymethyl cellulose, and other biopolymer and bio based polymers.

6. The filter tow of claim 1, comprising no more than 20% by weight hemp filler based on the total weight of fibrous material in the filter tow.

7. The filter tow of claim 1, comprising 30 to 45% by weight abaca based on the total weight of fibrous material in the filter tow.

8. The filter tow of claim 1, comprising 15 to 30% cotton flock based on the total weight of fibrous material in the filter tow.

9. The filter tow of claim 1, wherein the hemp has a mean fiber length in the range from 1 mm to 3.5 mm.

10. The filter tow of claim 1, wherein the hemp has a fiber diameter that is no greater than 50 μm.

11. The filter tow of claim 1, wherein the cotton flock has a cotton fiber length that is no greater than 1500 μm.

12. The filter tow of claim 11, wherein the cotton fiber length is in the range of 250-1000 μm.

13. The filter tow of claim 12, wherein the cotton flock has a cotton fiber thickness that is in the range from 10-50 μm.

14. The filter tow of claim 1, wherein the regenerated cellulose fibers have a fiber length in the range from 2 to 6 mm.

15. The filter tow of claim 1, wherein the fibrous materials are formed into a fibrous web having an open bulky structure with a volume density of no greater than 200 kg·m$^{-3}$.

16. The filter tow of claim 1, wherein the at least three natural fibrous materials are formed into a fibrous web having an areal density in the range from 25 $g \cdot m^{-2}$ to 65 $g \cdot m^{-2}$.

17. A biodegradable cigarette filter material consisting of a natural binder;
30-40% by weight of regenerated cellulose fiber based on the total weight of fibrous material in the filter material; and
at least three natural fibrous materials, the natural fibrous materials comprising:
5-25% by weight of hemp fiber or filler based on the total weight of fibrous material in the filter material;
20-50% by weight of abaca pulp or fiber based on the total weight of fibrous material in the filter material; and
10-30% by weight of cotton flock based on the total weight of fibrous material in the filter material.

18. The biodegradable cigarette filter material of claim 17, comprising a non-woven fibrous web.

19. A method of making a biodegradable cigarette filter material, comprising:
dispersing a mixture of fibrous materials in water, the fibrous materials comprising 5-25% by weight of hemp; 20-50% by weight of abaca; 10-30% by weight of cotton flock; and 30-40% by weight of regenerated cellulose fibers in water;
forming the dispersed fiber mixture into a non-woven fibrous sheet in a wetlaid or papermaking machine;
removing excess water from the non-woven fibrous sheet using suction;
adding a natural binder selected from the group consisting of natural latex, vegetable gums, starch based binders, cationic starch binder and carboxymethyl cellulose (CMC) to the fiber mixture prior to or during formation of the non-woven fibrous sheet;
drying the non-woven fibrous sheet; and
forming the non-woven fibrous sheet into cigarette filter tow.

* * * * *